(12) United States Patent
Liu

(10) Patent No.: US 12,126,742 B2
(45) Date of Patent: Oct. 22, 2024

(54) CROSS-BLOCKCHAIN MUTUAL DATA STORAGE

(71) Applicant: Tencent Technology (Shenzhen) Company Limited, Guangdong (CN)

(72) Inventor: Pan Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 292 days.

(21) Appl. No.: 17/715,824

(22) Filed: Apr. 7, 2022

(65) Prior Publication Data

US 2022/0231869 A1 Jul. 21, 2022

Related U.S. Application Data

(63) Continuation of application No. PCT/CN2020/129004, filed on Nov. 16, 2020.

(30) Foreign Application Priority Data

Mar. 13, 2020 (CN) .......................... 202010175290.9

(51) Int. Cl.
*H04L 29/00* (2006.01)
*G06F 16/23* (2019.01)
(Continued)

(52) U.S. Cl.
CPC ............ *H04L 9/50* (2022.05); *G06F 16/2308* (2019.01); *G06F 16/27* (2019.01); *H04L 9/0825* (2013.01)

(58) Field of Classification Search
CPC ....... H04L 9/50; H04L 9/0825; H04L 9/3247; H04L 63/12; H04L 67/1097;
(Continued)

(56) References Cited

U.S. PATENT DOCUMENTS

2016/0283920 A1 9/2016 Fisher et al.
2018/0331835 A1* 11/2018 Jackson ................ H04L 9/3297
(Continued)

FOREIGN PATENT DOCUMENTS

CN 106960388 A 7/2017
CN 106991334 A 7/2017
(Continued)

OTHER PUBLICATIONS

International Search Report and Written Opinion for PCT/CN2020/129004, issued Feb. 27, 2021, 12 pages, English translation included.

*Primary Examiner* — Ghazal B Shehni
(74) *Attorney, Agent, or Firm* — Banner & Witcoff, Ltd.

(57) ABSTRACT

A cross-blockchain mutual data storage method includes obtaining, in a first node in a first blockchain network, initial data from a first relay node in the first blockchain network, and verifying the initial data according to a first oracle contract in the first node. The method further includes, in response to the verification being successful, converting the initial data from a first data format into a second data format, and determining the initial data in the second data format as to-be-transferred data, the second oracle contract being deployed on a second node in a second blockchain network. The method also includes transmitting the to-be-transferred data to the first relay node, so that the first relay node transmits the to-be-transferred data to the second node for storage of the to-be-transferred data.

20 Claims, 12 Drawing Sheets

(51) Int. Cl.
*G06F 16/27* (2019.01)
*H04L 9/00* (2022.01)
*H04L 9/08* (2006.01)

(58) Field of Classification Search
CPC .. G06F 16/2308; G06F 16/27; G06F 16/1844; G06F 16/2365; G06F 21/6218; G06F 21/64; G06F 16/1837; G06F 16/258; G06Q 40/04
See application file for complete search history.

(56) References Cited

U.S. PATENT DOCUMENTS

| | | | |
|---|---|---|---|
| 2019/0228086 A1 | 7/2019 | Bordens | |
| 2019/0340267 A1* | 11/2019 | Vo | G06F 16/2365 |
| 2019/0361992 A1* | 11/2019 | Kaguma | H04L 9/0637 |
| 2020/0294143 A1* | 9/2020 | Qiu | H04L 9/50 |
| 2021/0042112 A1* | 2/2021 | Covaci | G06F 9/3001 |

FOREIGN PATENT DOCUMENTS

| | | |
|---|---|---|
| CN | 108932297 A | 12/2018 |
| CN | 110263579 A | 9/2019 |
| CN | 111127206 A | 5/2020 |

\* cited by examiner

CROSS-BLOCKCHAIN MUTUAL DATA STORAGE

RELATED APPLICATIONS

This application is a continuation of International Application No. PCT/CN2020/129004, filed on Nov. 16, 2020, which claims priority to Chinese Patent Application No. 202010175290.9, entitled "CROSS-BLOCKCHAIN DATA MUTUAL STORAGE METHOD, APPARATUS, DEVICE, AND STORAGE MEDIUM" and filed on Mar. 13, 2020. The entire disclosures of the prior applications are hereby incorporated by reference.

FIELD OF THE TECHNOLOGY

This application relates to the field of blockchain technologies, including a cross-blockchain data mutual storage method, an apparatus, a device, and a non-transitory storage medium.

BACKGROUND OF THE DISCLOSURE

At present, in a process of data interaction between a blockchain A and a blockchain B, it is necessary to transfer transaction data information from the blockchain A to the blockchain B by circulation. This means that when this transaction data information exists in a certain node (for example, a second node) in the blockchain B, the corresponding node (for example, a first node) in the blockchain A will not store this transaction data information.

For example, if the first node needs to transfer a transaction in the blockchain A to the second node in the blockchain B, the first node needs to freeze the transaction or data information (e.g., asset) corresponding to the transaction in the blockchain A, and when the second node in the blockchain B confirms the receipt of the transaction or the corresponding data information, the first node destroys the original transaction or corresponding data information in the blockchain A and instructs the second node to issue another transaction or corresponding data information that is the same as the transaction or corresponding data information in the blockchain B, so as to implement cross-chain data circulation.

SUMMARY

Embodiments of this disclosure provide a cross-blockchain mutual data storage method, apparatus, device, and non-transitory storage medium, which can implement the mutual storage of information across blockchains.

In an embodiment, a cross-blockchain mutual data storage method includes obtaining, by processing circuitry of a first node in a first blockchain network, initial data in a first data format from a first relay node in the first blockchain network, the first blockchain network corresponding to a first blockchain, and the initial data including transaction data in a target block in the first blockchain, and verifying the initial data according to a first oracle contract in the first node. The method further includes, in response to a determination that the verification was successful, converting, according to a second data format configured for cross-chain transaction and specified in a second oracle contract associated with the first oracle contract, the initial data from the first data format into the second data format, and determining the initial data in the second data format as to-be-transferred data, the second oracle contract being deployed on a second node in a second blockchain network, and transmitting the to-be-transferred data to the first relay node, so that the first relay node transmits the to-be-transferred data to the second node for storage of the to-be-transferred data.

In an embodiment, a cross-blockchain mutual data storage method includes receiving, by processing circuitry of a second node in a second blockchain network, based on a second cross-chain contract deployed in the second node, to-be-transferred data transmitted by a second relay node on the second blockchain network, the to-be-transferred data having been transmitted from a first relay node in a first blockchain network different from the second blockchain network to the second relay node, a first node in the first blockchain network deploying a first oracle contract and a first cross-chain contract, the second node deploying a second oracle contract, the to-be-transferred data being generated by the first node by converting initial data in a first data format into on a second data format specified in the second oracle contract associated with the first oracle contract, and the first node being configured to transmit the to-be-transferred data to the first relay node according to the first cross-chain contract, and verifying the to-be-transferred data based on the second oracle contract. The method further includes converting the to-be-transferred data from the second data format to a third data format to obtain target data in response to a determination that the verification is successful, and writing the target data into a second blockchain corresponding to the second blockchain network.

In an embodiment, a cross-blockchain mutual data storage apparatus includes processing circuitry of a first node in a first blockchain network, the processing circuitry being configured to obtain initial data in a first data format from a first relay node in the first blockchain network, the first blockchain network corresponding to a first blockchain, and the initial data including transaction data in a target block in the first blockchain, and verify the initial data according to a first oracle contract deployed in the first node. The processing circuitry is further configured to, in response to a determination that the verification was successful, convert, according to a second data format configured for cross-chain transaction and specified in a second oracle contract associated with the first oracle contract, the initial data from the first data format into the second data format, and determine the initial data in the second data format as to-be-transferred data, the second oracle contract being deployed on a second node in a second blockchain network, and transmit the to-be-transferred data to the first relay node, so that the first relay node transmits the to-be-transferred data to the second node for storage of the to-be-transferred data.

A non-transitory storage medium storing computer instructions, when executed by one or more processors, cause the one or more processors to perform operations or methods described in this disclosure is also contemplated.

In the embodiments of this disclosure, a first node in a first blockchain network can obtain initial data information in a first data format from a first relay node in the first blockchain network according to a first oracle contract deployed on the first node. The initial data information is determined according to transaction data information in a target block in a first blockchain corresponding to the first blockchain network that includes the first relay node. Further, when the first node successfully verifies the initial data information, the first node may convert the data format of the initial data information into a second data format specified by the first oracle contract and a second oracle contract, and then the first relay node may transmit to-be-transferred data information in the second data format to a second relay node in a second blockchain network, so that the second relay node stores the to-be-transferred data information in a second node in the second blockchain network. In addition, additional transaction data information in the second blockchain may also be sent for storage in the first blockchain. It can be seen that the embodiments of this disclosure can implement the mutual storage of information across blockchains.

BRIEF DESCRIPTION OF THE DRAWINGS

To describe the technical solutions of the embodiments of this disclosure, the following briefly introduces the accompanying drawings describing the embodiments. The accompanying drawings in the following description show only some embodiments of this disclosure, and a person of ordinary skill in the art may still derive other drawings from these accompanying drawings.

DESCRIPTION OF EMBODIMENTS

The technical solutions in embodiments of this disclosure are described in the following with reference to the accompanying drawings in the embodiments of this disclosure. The described embodiments are merely some rather than all of the embodiments of this disclosure. All other embodiments obtained by a person of ordinary skill in the art based on the embodiments of this disclosure shall fall within the scope of this disclosure.

As mentioned above, in some blockchain technologies, in the process of data circulation on different blockchains, it is difficult to implement the storage of the same data information on different blockchains. Therefore, the embodiments of this disclosure provide a cross-blockchain mutual data storage method, apparatus, device, and non-transitory storage medium, which can implement the mutual storage of information across blockchains.

Figure 1:
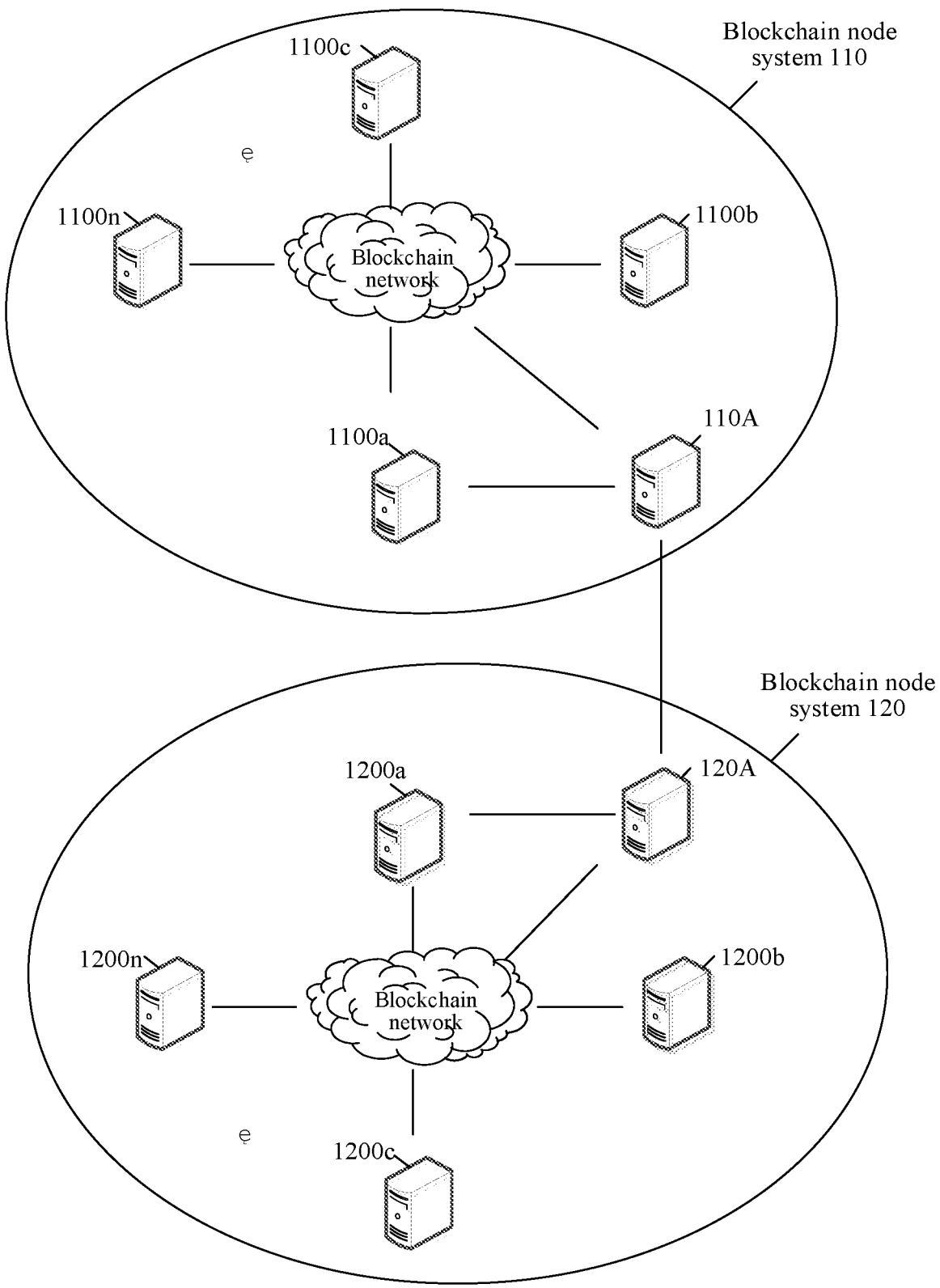
FIG. 1 is a schematic structural diagram of a blockchain node system according to an embodiment of this disclosure.

FIG. 1 is a schematic structural diagram of a blockchain node system according to an embodiment of this disclosure. As shown in FIG. 1, a node in a blockchain node system 110 (that is a first blockchain node system) and a node in a blockchain node system 120 (that is a second blockchain node system) in the embodiments of this disclosure can implement storage of cross-chain data information. The blockchain node system 110 may include a plurality of nodes. As shown in FIG. 1, the blockchain node system 110 may specifically include a node 1100a, a node 1100b, a node 1100c, . . . , a node 1100n, and a relay node (for example, a relay node 110A). The blockchain node system 120 may include a plurality of nodes. As shown in FIG. 1, the blockchain node system 120 may specifically include a node 1200a, a node 1200b, a node 1200c, . . . , a node 1200n, and a relay node (for example, a relay node 120A). The nodes and the relay nodes may be, for example, various computer devices.

In the embodiments of the present disclosure, a blockchain network corresponding to the blockchain node system 110 may be referred to as a first blockchain network, and a blockchain corresponding to the first blockchain network may be referred to as a first blockchain. In the embodiments of this disclosure, a blockchain network corresponding to the blockchain node system 120 may be referred to as a second blockchain network, and a blockchain corresponding to the second blockchain network may be referred to as a second blockchain.

Currently, the types of blockchains may include a public blockchain, a private blockchain, and a consortium blockchain. The public blockchain is a blockchain that is open to the public and can be joined and accessed by any person. Blocks on the public blockchain can be viewed by any person, any person can initiate transactions on the public blockchain and can participate in a consensus process of the public blockchain at any time. The private blockchain is a blockchain that can be used within a private organization, where read and write permissions and a permission to participate in accounting are specified according to rules of the private organization. The private blockchain is usually used for data management, auditing, or the like within an enterprise. The consortium chain is a blockchain that can be joined only by consortium members, where read and write permissions and a permission to participate in accounting are specified according to rules of a consortium. The consortium blockchain is generally used for inter-institutional transaction, settlement or clearing scenarios. Two different types of blockchains may have their own specifications. For example, a consensus mechanism in the public blockchain is generally Proof of Work (PoW) or Proof of Stake (PoS), while a consensus mechanism in the consortium blockchain is generally a Proof of Stake, Practical Byzantine Fault Tolerant (PBFT), or RAFT consensus algorithm. Two blockchains of the same type also have differences in their respective management specifications. For example, for two consortium blockchains, the consensus mechanism of one consortium blockchain may be Proof of Stake, and the consensus mechanism of the other consortium blockchain may be a PBFT consensus mechanism.

It is to be understood that the embodiments of this disclosure describe a method for mutual storage of cross-chain information, where the cross-chain interaction between two blockchains may be classified into interaction across homogeneous blockchains and interaction across heterogeneous blockchains according to different underlying technology platforms of the blockchains. It can be understood that because homogeneous blockchains may have the same security mechanism, consensus algorithm, network topology, and block generation and verification logic, the interaction across homogeneous blockchains is relatively simple. In contrast, the interaction across heterogeneous blockchains is relatively complex. For example, Bitcoin adopts the PoW algorithm, while the consortium blockchain Fabric (a core blockchain framework launched by the Hyperledger) adopts a traditional deterministic consensus algorithm. They differ greatly in the composition form of blocks and the deterministic guarantee mechanism, making it difficult to design a direct interaction mechanism between them.

It can be understood that the first blockchain and the second blockchain in the embodiments of this disclosure may be two blockchains of different types. For example, the first blockchain may be a private blockchain, and the second blockchain may be a consortium blockchain. The first blockchain and the second blockchain in the embodiments of this disclosure may also be two blockchains of the same type. For example, the first blockchain may be a consortium blockchain, and the second blockchain may also be a consortium blockchain. No limitation is imposed herein.

As shown in FIG. 1, in the blockchain node system 110, each node can obtain transaction data information associated with a first service contract in the first blockchain network during normal operation, so as to maintain shared data within the blockchain node system 110. To ensure information intercommunication in the blockchain node system 110, the nodes in the blockchain node system 110 may establish a network connection each other and perform data transmission through the network connection. For example, when any node in the blockchain node system 110 obtains transaction data information, the other nodes in the blockchain node system 110 can obtain the transaction data information according to a consensus algorithm, and store the transaction data information as data in the shared data, so that all the nodes in the blockchain node system 110 store the same data.

In the blockchain node system 120, each node can obtain target data information associated with a second service contract in the second blockchain network during normal operation, so as to maintain shared data within the blockchain node system 120. To ensure information intercommunication in the blockchain node system 120, the nodes in the blockchain node system 120 may establish a network connection each other and perform data transmission through the network connection. For example, when any node in the blockchain node system 120 obtains target data information, the other nodes in the blockchain node system 120 can obtain the target data information according to a consensus algorithm, and store the target data information as data in the shared data, so that all the nodes in the blockchain node system 120 store the same data.

Each node in the blockchain node system (the blockchain node system 110 or the blockchain node system 120) has a corresponding node identifier. Each node in the blockchain node system may store identifiers of other nodes that have a network connection relationship with the current node, and subsequently broadcast a generated block to the other nodes in the blockchain node system according to the node identifiers of the other nodes. Each node may maintain a node identifier list shown in the following table, and store node names and node identifiers in the node identifier list in correspondence. The node identifier may be an Internet Protocol (IP) address or any other information that can be used to identify the node. Table 1 takes the IP address as an example for description.

TABLE 1

| Node name | Node identifier |
| --- | --- |
| Node 1 | 117.114.151.174 |
| Node 2 | 117.116.189.145 |
| ... | ... |
| Node N | 119.123.789.258 |

It is to be understood that in the embodiments of this disclosure, one node may be selected from the plurality of nodes in the blockchain node system 110 shown in FIG. 1 as a first node in the first blockchain network corresponding to the first blockchain node system. For example, in the embodiments of this disclosure, the node 1100a in the blockchain node system 110 may be used as the first node in the blockchain network. A service contract such as a service contract, a cross-chain contract, or an oracle contract may be deployed on the first node.

The smart contract may be understood as a computer program configured to run on a distributed ledger (that is, blockchain) with preset rules and state-conditional responses, and encapsulate, verify, and execute complex behaviors of distributed nodes to implement information exchange, value transfer, and asset management. It can be understood that in the embodiments of this disclosure, a service contract deployed on the first node may be referred to as a first service contract, a cross-chain contract deployed on the first node may be referred to as a first cross-chain contract, and an oracle contract deployed on the first node may be referred to as a first oracle contract.

In the embodiments of this disclosure, one node may be selected from the plurality of nodes in the blockchain node system 120 shown in FIG. 1 as a second node in the second blockchain network corresponding to the second blockchain node system. For example, in the embodiments of this disclosure, the node 1200a in the blockchain node system 120 may be used as the second node in the blockchain network. A service contract such as a service contract, a cross-chain contract, or an oracle contract may be deployed on the second node. It can be understood that in the embodiments of this disclosure, a service contract deployed on the second node may be referred to as a second service contract, a cross-chain contract deployed on the second node may be referred to as a second cross-chain contract, and an oracle contract deployed on the second node may be referred to as a second oracle contract.

The oracle contract may be a mechanism for writing data information outside the blockchain into the blockchain. A blockchain node deployed with an oracle contract can serve as a bridge for data interaction between the blockchain and the real world. When a smart contract on the blockchain has a data interaction demand, the blockchain node deployed with the oracle contract helps the smart contract to collect external data outside the blockchain after receiving the demand, and then feed the obtained data back to the smart contract on the chain after verification. There are many application scenarios for oracle contracts. It can be understood that a decentralized application needing to perform data interaction with outside of the blockchain uses an oracle contract. For example, the application scenarios include financial derivatives trading platforms, lending platforms, courier tracking, stablecoins, betting games, insurance, and prediction markets implemented using networks and computer devices.

It is to be understood that the node 1100a in the blockchain node system 110 in the embodiments of this disclosure may perform a cross-chain transaction on transaction data information (i.e., transaction data) in the first blockchain through the relay node 110A, and then may transmit the transaction data information to the relay node 120A in the blockchain node system 120. In this case, the relay node 120A may store the received transaction data information on the first blockchain into the second blockchain through the node 1200a.

It can be understood that the blockchain node system 110 and the blockchain node system 120 may each include a plurality of relay nodes. As shown in FIG. 1, the relay node 110A may be a relay node having a network connection relationship with the node 1100a, and the relay node 120A may be a relay node having a network connection relationship with the node 1200a.

As shown in FIG. 1, the node 1100a may identify, from the first blockchain network, the relay node 110A having a network connection relationship with the node 1100a. In the embodiments of this disclosure, a relay node having a network connection relationship with the first node in the first blockchain network may be referred to as a first relay node. Further, the node 1100a may obtain transaction data information in a target block on the first blockchain corresponding to the first blockchain network that is detected by the relay node 110A, and then may determine a data format of the transaction data information as a first data format and determine the transaction data information in the first data format as initial data information. In the embodiments of this disclosure, a block with a latest generation timestamp on the first blockchain may be referred to as the target block. It can be understood that the transaction data information in the target block may be generated by the node 1100a (that is, the first node) based on the first service contract in the first blockchain network.

The transaction data information may be a trial result of a certain case (for example, criminal case X) and evidence materials provided during the trial in a judicial scenario, which are inputted by a user terminal associated with the node 1100a. The transaction data information may also be logistics information indicating that an express delivery (for example, daily necessity Y) arrives at a designated area, which is certified by a user terminal associated with the node 1100a by scanning a two-dimensional code in an express logistics scenario. The user terminal associated with the node 1100a may be a smart terminal with a service data processing function, such as a smart phone, a tablet computer, or a desktop computer. The transaction data information may also be process information such as billing, circulation, entry, reimbursement, and so on of an electronic bill (for example, electronic bill Z) associated with the node 1100a in an electronic bill processing scenario. The examples will not be enumerated herein.

The first data format may be a data format used by each node of the first blockchain network for data information exchange. It is to be understood that the data format is a rule describing how data is stored in a file or record. For example, the data format may be binary format, pb format, xml format, json format, msgpack format, or the like.

In this case, the relay node 110A may transmit the initial data information (i.e., initial data) in the first data format (for example, pb format) to the node 1100a shown in FIG. 1. Further, the node 1100a may verify the obtained initial data information by using the first oracle contract. It is to be understood that the first oracle contract has an association relationship with the second oracle contract deployed on the second node. In other words, the first oracle contract and the second oracle contract may specify a data format for cross-chain transactions. In the embodiments of this disclosure, the second data format may be determined as the data format for cross-chain transactions. When the verification performed by the node 1100a is successful, the node 1100a may convert the data format of the initial data information from the first data format to the second data format, and may determine the initial data information in the second data format as to-be-transferred data information.

Figure 2:
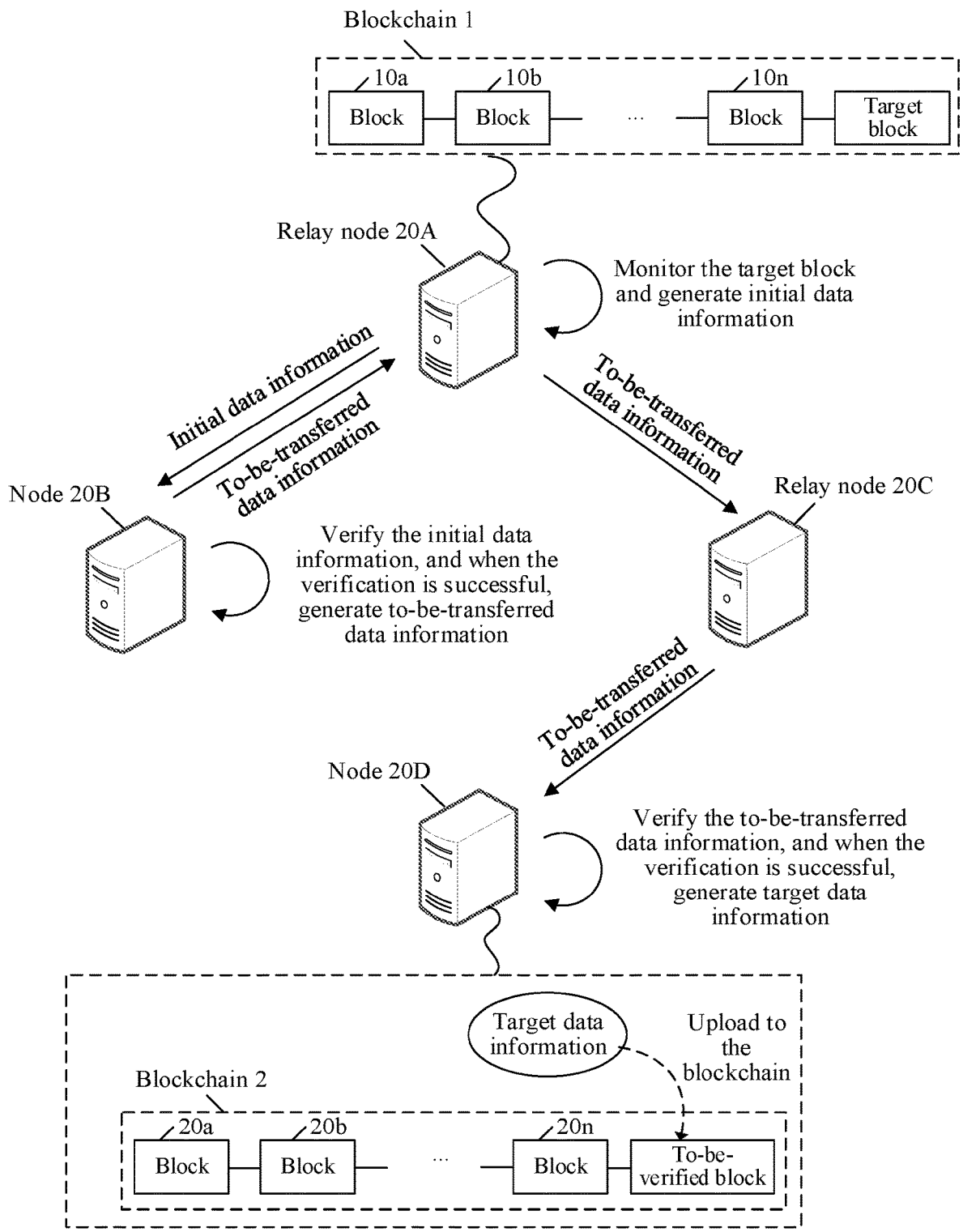
FIG. 2 is a schematic diagram showing a data interaction scenario according to an embodiment of this disclosure.

Further, the node 1100a may transmit the to-be-transferred data information (i.e., to-be-transferred data) to the relay node 110A, so that the relay node 110A may transmit the to-be-transferred data information to the relay node 120A (that is, the second relay node) shown in FIG. 2. It is to be understood that the relay node 120A has a network connection relationship with the node 1200a in the second blockchain network, and the relay node 120A may transmit the to-be-transferred data information to the node 1200a (that is, the second node). In this case, the node 1200a may verify the to-be-transferred data information based on the second oracle contract. When the verification is successful, the node 1200a may convert the data format of the to-be-transferred data information from the second data format to a third data format to obtain target data information. In the embodiments of this disclosure, the to-be-transferred data information in the third data format may be referred to as the target data information. The third data format is a data format used by each node of the second blockchain network for data information exchange. Further, the node 1200a may write the target data information into the second blockchain corresponding to the second blockchain network corresponding to the blockchain node system 120.

In an embodiment, the node 1200a in the blockchain node system 120 in the embodiments of this disclosure may further perform a cross-chain transaction on transaction data information in the second blockchain through the relay node 120A, and then may transmit to-be-transferred data information (i.e., additional to-be-transferred data) corresponding to the transaction data information to the relay node 110A in the blockchain node system 110. In this case, the relay node 110A may store the received to-be-transferred data information on the second blockchain into the second blockchain through the node 1100a. It can be seen that the embodiments of this disclosure can implement the mutual storage of information across blockchains.

For ease of understanding, further, refer to FIG. 2, which is a schematic diagram showing a data interaction scenario according to an embodiment of this disclosure. A relay node 20A in the embodiments of this disclosure may be a first relay node in a first blockchain network, and the first relay node may correspond to the relay node 110A in FIG. 1. A node 20B in the embodiments of this disclosure may be a first node in the first blockchain network, and the first node may be any node of the blockchain node system 110 (that is, the first blockchain system) in FIG. 1, for example, the node 1100a. A relay node 20C in the embodiments of this disclosure may be a second relay node in a second blockchain network, and the second relay node may be the relay node 120A in FIG. 1. A node 20D in the embodiments of this disclosure may be a second node in the second blockchain network, and the second node may be any node of the blockchain node system 120 (that is, the second blockchain system) in FIG. 1, for example, the node 1200a.

It is to be understood that the types of a first blockchain corresponding to the first blockchain network and a second blockchain corresponding to the second blockchain network may be the same or different, which is not limited herein. In the embodiments of this disclosure, a judicial scenario is used as an example of the application scenario to describe storage of transaction data information (for example, data information associated with a civil case) in a judicial extranet into a judicial intranet. The first blockchain may be a blockchain corresponding to the judicial extranet, and the second blockchain may be a blockchain corresponding to the judicial intranet.

It can be understood that the blockchain 1 shown in FIG. 2 may be the first blockchain corresponding to the first blockchain network corresponding to the blockchain node system 110 in FIG. 1, the blockchain 1 may be the same blockchain shared by each node in the first blockchain network corresponding to node 20B, and each node may store the transaction data information associated with the first service contract in the blockchain 1. The blockchain 1 includes a block 10a, a block 10b, . . . , a block 10n, and a target block. The block 10a may be referred to as a genesis block of the blockchain 1. The target block in the blockchain 1 includes transaction data information of the node 20B associated with the first service contract. For example, the transaction data information may be a trial result of a civil case and evidence materials provided during the trial.

It is to be understood that the node 20B may determine (or identify), from the first blockchain network, the relay node 20A having a network connection relationship with the node 20B. It can be understood that the relay node 20A can obtain the transaction data information in the target block on the blockchain 1 shown in FIG. 2 based on the first oracle contract deployed in the relay node 20A. Further, the node 20B may obtain the transaction data information, and then may determine a data format of the transaction data information as a first data format and determine the transaction data information in the first data format as initial data information. The first data format is a data format used by each node of the first blockchain network for data information exchange. For example, the first data format is pb format.

In this case, the node 20B may invoke the first oracle contract deployed on the node 20B, so as to obtain the initial data information from the relay node 20A. Further, the node 20B may verify the initial data information based on a data verification function in the first oracle contract. The data verification function is a function for verifying initial data information. When the verification performed by the node 20B is successful, the node 20B may determine the data format of the initial data information as the first data format, convert the data format of the initial data information from the first data format to the second data format, and determine the initial data information in the second data format as to-be-transferred data information. The second data format is specified by the first oracle contract and a second oracle contract. The second oracle contract may be deployed in the node 20D.

It is to be understood that the node 20B may transmit the to-be-transferred data information to the relay node 20A based on a cross-chain data transfer function in the first cross-chain contract deployed in the node 20B, so that the relay node 20A may transmit the to-be-transferred data information to the relay node 20C shown in FIG. 2. The cross-chain data transfer function may be a function for transferring the to-be-transferred data information of the node 20B to the relay node 20C. Further, the node 20D may obtain the to-be-transferred data information from the relay node 20C based on a cross-chain data transfer function in the second cross-chain contract included in the node 20D.

In this case, the node 20D may verify the to-be-transferred data information based on the second oracle contract deployed in the node 20D. When the verification is successful, the node 20D may convert the data format of the to-be-transferred data information from the second data format to a third data format (for example, json format) to obtain target data information. The third data format is a data format used by each node of the second blockchain network for data information exchange. Further, the node 20D may write the target data information into a second blockchain (for example, the blockchain 2 shown in FIG. 2) corresponding to the second blockchain network.

It can be understood that the blockchain 2 shown in FIG. 2 may be the second blockchain corresponding to the second blockchain network corresponding to the blockchain node system 120 in FIG. 1, the blockchain 2 may be the same blockchain shared by each node in the second blockchain network corresponding to node 20D, and in the blockchain 2, each node may obtain information stored in the blockchain. The blockchain 2 includes a block 20a, a block 20b, a block 20n, and a to-be-verified block. The block 20a may be referred to as a genesis block of the blockchain 2. The to-be-verified block in the blockchain 2 includes the target data information in the third data format.

The node 20D may write the target data information (i.e., target data) into the second blockchain corresponding to the second blockchain network corresponding to the node 20D. In other words, the node 20D may obtain the block 20n with a latest generation timestamp from the blockchain 2. Further, the node 20D may generate a to-be-verified block to be written into the blockchain 2 according to the target data information. In this case, the node 20D may broadcast the to-be-verified block including the target data information to all blockchain nodes in the second blockchain network (for example, a consensus node for consensus processing). When it is determined that all the blockchain nodes reach a consensus, the to-be-verified block may be written into the blockchain 2, that is, the to-be-verified block may be used as a block next to the block 20n, so that the initial data information in the target block in the blockchain 1 may be stored to the target data information in the to-be-verified block in the blockchain 2, so as to implement the storage of the transaction data information on the first blockchain into the second blockchain.

The first relay node in the first blockchain network and the second relay node in the second blockchain network may also be the same relay node (for example, relay node a). In other words, the relay node a may have a network connection relationship with the first node in the first blockchain network, and at the same time may also have a network connection relationship with the second node in the second blockchain network.

In an embodiment, the transaction data information on the second blockchain may also be stored in the first blockchain. For specific implementations, reference may be made to the above description of the storage of the transaction data information of the first blockchain into the second blockchain, and the details will not be repeated herein. It can be seen that the embodiments of this disclosure can implement the mutual storage of information across blockchains.

For specific implementations of cross-chain information storage between the first node in the first blockchain network and the second node in the second blockchain network, reference may be made to the embodiments corresponding to FIG. 3 to FIG. 8 below.

Figure 3:
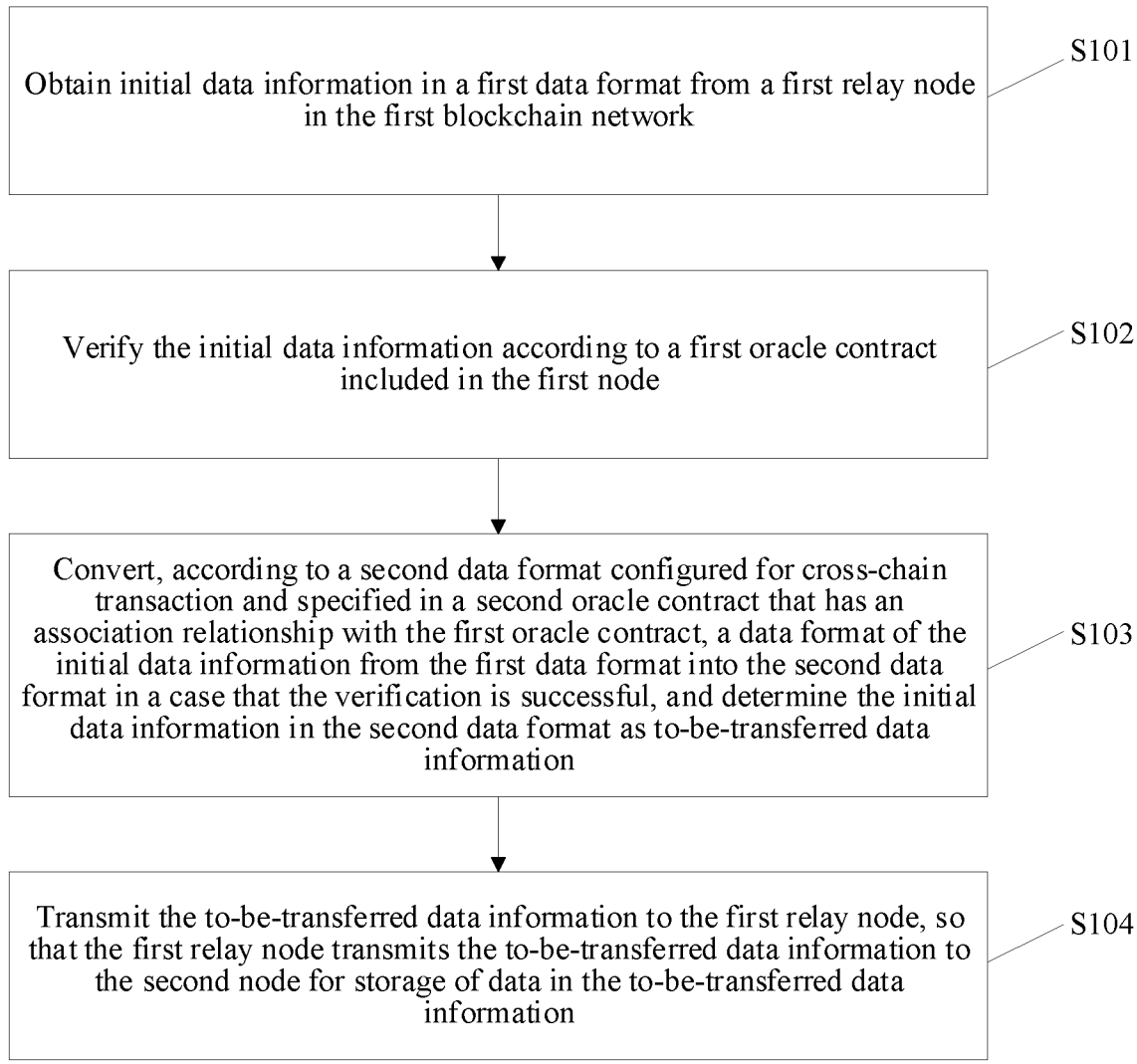
FIG. 3 is a schematic flowchart of a cross-blockchain data mutual storage method according to an embodiment of this disclosure.

Further, FIG. 3 is a schematic flowchart of a cross-blockchain mutual data storage method according to an embodiment of this disclosure. The method may be performed by a first node in a first blockchain network. For details, reference may be made to the description of step S101 to step S104 below. As shown in FIG. 3, the method may include the following steps:

In step S101, initial data information (i.e., initial data) in a first data format is obtained from a first relay node in the first blockchain network.

Specifically, the first node in the first blockchain network may determine (or identify), from the first blockchain network, a relay node having a network connection relationship with the first node. In the embodiments of this disclosure, the relay node having a network connection relationship with the first node in the first blockchain network may be referred to as the first relay node. It can be understood that the first relay node may detect transaction data information in a target block on a first blockchain corresponding to the first blockchain network. The target block may be a block with a latest generation timestamp in the first blockchain. Further, the first node may obtain the transaction data information, and then may determine a data format of the transaction data information as a first data format and determine the transaction data information in the first data format as initial data information. The first data format may be a data format used by each node of the first blockchain network for data information exchange. Further, the first node may invoke a first oracle contract deployed on the first node, so as to obtain the initial data information from the first relay node. The transaction data information is determined based on the first service contract in the first node.

It is to be understood that the first node in this embodiment of this disclosure may be the node 20B shown in FIG. 2, and the node 20B may be any node in the blockchain node system 110 shown in FIG. 1, for example, the node 1100a. The first relay node in this embodiment of this disclosure may be the node 20A shown in FIG. 2, and the node 20A may be the relay node 110A in the blockchain node system 110 shown in FIG. 1. The second node in this embodiment of this disclosure may be the node 20D shown in FIG. 2, and the node 20D may be any node in the blockchain node system 120 shown in FIG. 1, for example, the node 1200a. The second relay node in this embodiment of this disclosure may be the node 20C shown in FIG. 2, and the node 20C may be the relay node 120A in the blockchain node system 120 shown in FIG. 1.

A service contract such as the first service contract, a first cross-chain contract, or the first oracle contract may be deployed on the first node. A blockchain network corresponding to the first node may be referred to as a first blockchain network, and a blockchain corresponding to the first blockchain network may be referred to as a first blockchain. A service contract such as a second service contract, a second cross-chain contract, or a second oracle contract may be deployed on the second node. A blockchain network corresponding to the second node may be referred to as a second blockchain network, and a blockchain corresponding to the second blockchain network may be referred to as a second blockchain. It is to be understood that the blockchain types of the first blockchain and the second blockchain may be the same or different, which is not limited herein. For example, the first blockchain may be a Bitcoin blockchain, and the second blockchain may be an Ethereum blockchain.

As shown in FIG. 2, the first oracle contract may be deployed on the relay node 20A. It can be understood that the relay node 20A may monitor the target block on the blockchain 1 shown in FIG. 2, and then may obtain transaction data information in the target block based on the first oracle contract.

The transaction data information may be a trial result of a certain case (for example, criminal case X) and evidence materials provided during the trial in a judicial scenario, which are inputted by a user terminal associated with the first node. The transaction data information may also be logistics information indicating that an express delivery (for example, daily necessity Y) arrives at a designated area, which is certified by a user terminal associated with the first node by scanning a two-dimensional code in an express logistics scenario. The user terminal associated with the first node may be a smart terminal with a service data processing function, such as a smart phone, a tablet computer, or a desktop computer. The transaction data information may also be process information such as billing, circulation, entry, reimbursement, and so on of an electronic bill (for example, electronic bill Z) associated with the first node in an electronic bill processing scenario. The examples will not be enumerated herein.

Further, the node 20B may obtain the transaction data information, and then may determine a data format of the transaction data information as a first data format and determine the transaction data information in the first data format as initial data information. The first data format is a data format used by each node of the first blockchain network for data information exchange. For example, the first data format is pb format. In this case, the node 20B may invoke the first oracle contract deployed on the node 20B, so as to obtain the initial data information from the relay node 20A.

In step S102, the initial data information is verified according to a first oracle contract included (e.g., deployed) in the first node.

Specifically, the first node may invoke a data verification function in the first oracle contract to verify an attribute of the data format of the initial data information. It can be understood that if the attribute of the data format of the initial data information conforms to an attribute of the first data format used for data transaction in the first blockchain network, it may be determined that the verification performed by the first node is successful; and if the attribute of the data format of the initial data information does not conform to the attribute of the first data format used for data transaction in the first blockchain network, it may be determined that the verification performed by the first node fails.

It can be understood that the first node may invoke the data verification function in the first oracle contract deployed on the first node to determine the attribute of the data format of the initial data information. For example, the attribute of the data format of the initial data information is a block. In this case, the first node may verify whether the attribute of the block conforms to the attribute of the first data format used for data transaction in the first blockchain network (for example, the Bitcoin blockchain network). It can be understood that each block may include a block header and a block body.

Figure 4:
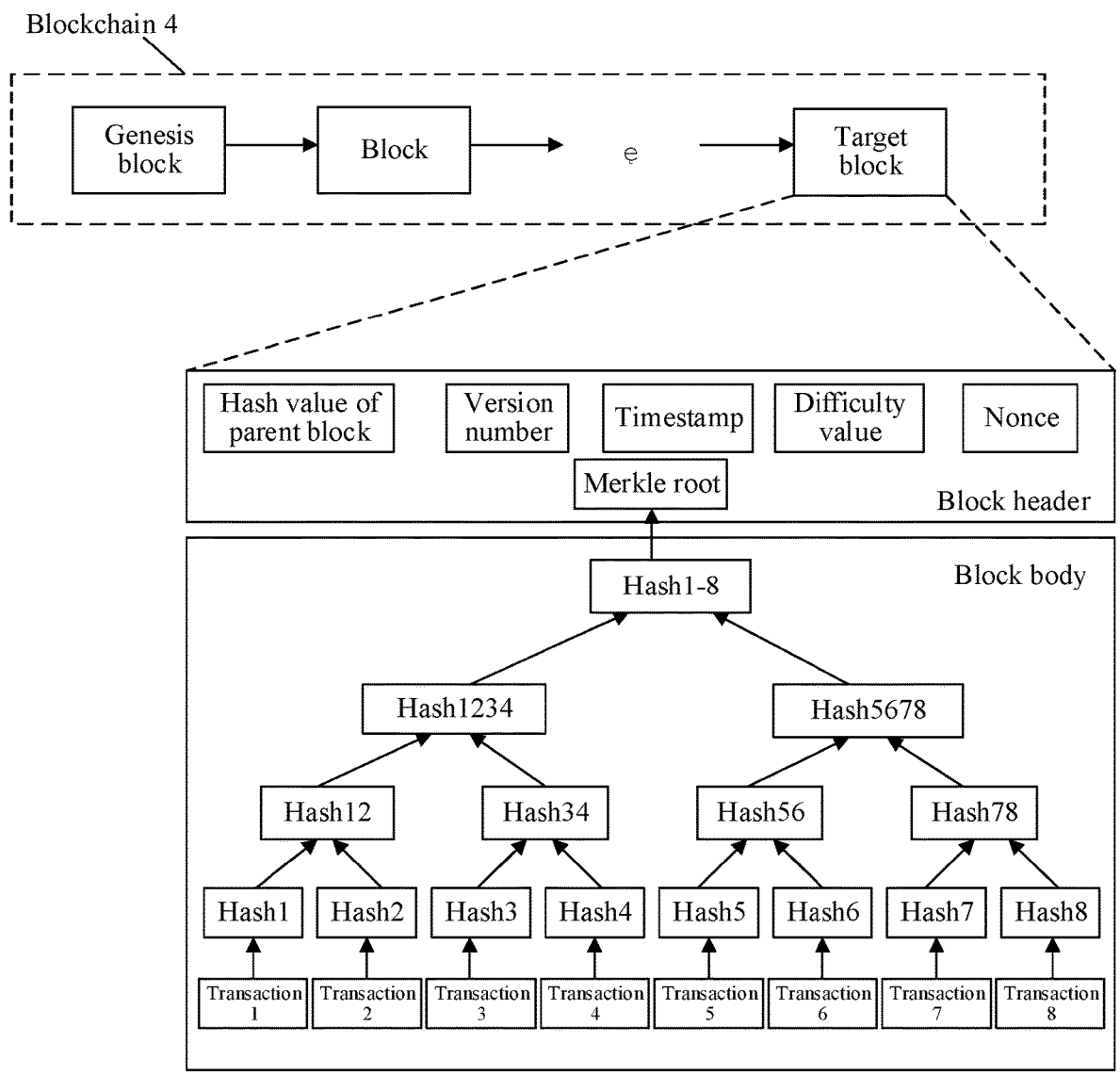
FIG. 4 is a schematic structural diagram of a blockchain according to an embodiment of this disclosure.

For ease of understanding, further, refer to FIG. 4, which is a schematic structural diagram of a blockchain according to an embodiment of this disclosure. A blockchain 4 in this embodiment of this disclosure may be the same blockchain (that is, the first blockchain) shared by each node in the blockchain node system 110 shown in FIG. 1 above. As shown in FIG. 4, the blockchain 4 may be composed of a plurality of blocks.

Each block includes a block header and a block body. A genesis block may include a block header and a block body. The block header stores a hash value, a version number, a timestamp, and a difficulty value corresponding to input information of this block. The block body stores transaction data information generated by the first node based on the first service contract. Taking the target block as an example, the target block may use a hash value of a previous block of the target block as a hash value of a parent block. The target block may also include a block header and a block body. The block header stores hash values of the target block, as a Merkle root of the target block, the hash value of the parent block, a version number, a timestamp, and a difficulty value. Similarly, block data stored in each block in the blockchain is associated with block data stored in the parent block, to ensure the security of input information in the block.

It is to be understood that the block header of the target block includes three sets of block metadata. A first set of metadata is data referencing the hash value of the parent block, and this set of metadata is used for connecting the target block with to a previous block of the target block in the blockchain 4. A second set of metadata is the difficulty value, the timestamp, the Nonce (Number Used Once), and the version number (used to track software/protocol updates), and this set of metadata is related to mining contention. A third set of metadata is the Merkle root (which is a data structure used for effectively summarizing all transactions in the target block).

It can be understood that, if the attribute of the data format of the initial data information received by the first node is a block (that is, the target block), and the target block contains the above-mentioned three sets of metadata, it may be determined that the verification performed by the first node is successful; and if a set of metadata is missing in the target block received by the first node, it may be determined that the verification performed by the first node fails.

In step S103, in response to a determination that the verification as successful, the initial data information (i.e., the initial data) is converted from the first data format into the second data format according to a second data format configured for cross-chain transaction and specified in a second oracle contract associated with the first oracle contract, and the initial data information in the second data format is determined as to-be-transferred data information, the second oracle contract being deployed on a second node in a second blockchain network.

Specifically, when the first node successfully verifies the initial data information, the first node may obtain the second oracle contract included in the second node in the second blockchain network different from the first blockchain network. The second oracle contract is deployed on the second node in the second blockchain network. Further, the first node may obtain the data format used for cross-chain transaction specified by the first oracle contract and the second oracle contract, and determine the data format used for cross-chain transaction as the second data format. In this case, the first node may convert the data format of the initial data information from the first data format to the second data format, and determine the initial data information in the second data format as to-be-transferred data information.

It is to be understood that in this embodiment of this disclosure, the data format used for cross-chain transaction specified by the first oracle contract and the second oracle contract is the second data format (for example, a binary format). Therefore, when the first node successfully verifies the initial data information, the first node may convert the initial data information in the first data format (for example, pb format) into the second data format, that is, into initial data information in the binary format. In this case, the first node may determine the initial data information in the binary format as the to-be-transferred data information.

In step S104, the to-be-transferred data information (e.g., the to-be-transferred data) is transmitted to the first relay node, so that the first relay node transmits the to-be-transferred data information to the second node in the second blockchain network for storage of the to-be-transferred data information.

Specifically, the first node may obtain the first cross-chain contract deployed on the first node. The first node may transmit the to-be-transferred data information to the first relay node by invoking a cross-chain data transfer function in the first cross-chain contract. In this case, the first relay node may obtain a public key of the second relay node in the second blockchain network, and encrypt the to-be-transferred data information based on the public key of the second relay node, to obtain encrypted data information. Further, the first relay node may transmit the encrypted data information to the second relay node, so that the second relay node may decrypt the encrypted data information based on a private key of the second relay node, to obtain the to-be-transferred data information. In this case, the second relay node may store data in the to-be-transferred data information obtained by the decryption through the second node.

Figure 5:
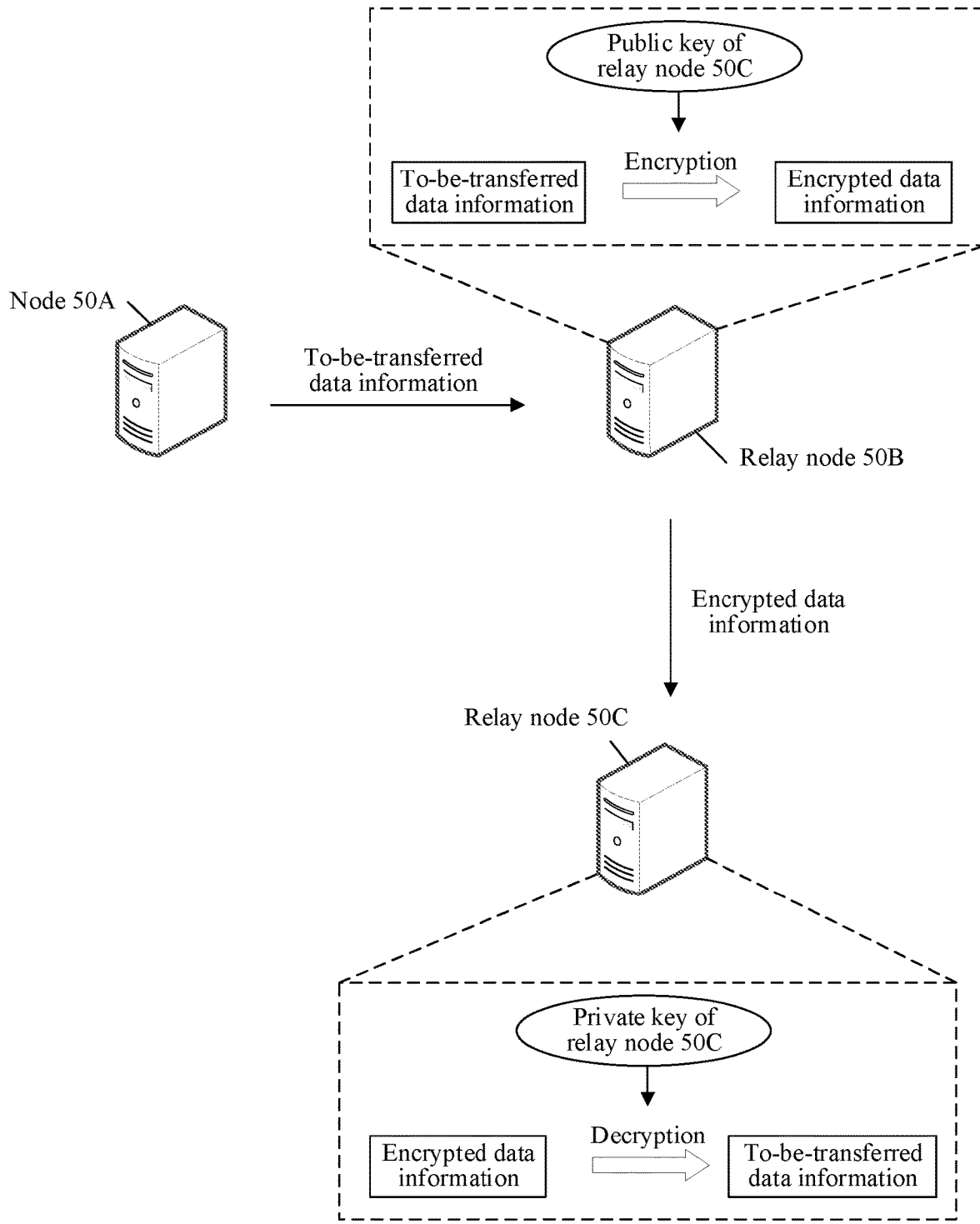
FIG. 5 is a schematic diagram showing a scenario of transmitting to-be-transferred data information according to an embodiment of this disclosure.

For ease of understanding, further, refer to FIG. 5, which is a schematic diagram showing a scenario of transmitting to-be-transferred data information according to an embodiment of this disclosure. As shown in FIG. 5, a node 50A in the embodiments of this disclosure may be a first node in the first blockchain network, and the first node may be any node of the blockchain node system 110 shown in FIG. 1, for example, the node 1100*a*. A relay node 50B in the embodiments of this disclosure may be a first relay node in a first blockchain network, and the first relay node may be the relay node 110A in FIG. 1. A relay node 50C in the embodiments of this disclosure may be a second relay node in a second blockchain network, and the second relay node may be the relay node 120A in FIG. 1.

It is to be understood that the node 50A may invoke a cross-chain data transfer function in the first cross-chain contract deployed on the node 50A to transmit the to-be-transferred data information to the relay node 50B. In this case, the relay node 50B may obtain a public key of the relay node 50C in the second blockchain network, and encrypt the to-be-transferred data information based on the public key, to obtain encrypted data information. Further, the relay node 50B may transmit the encrypted data information to the relay node 50C in the second blockchain network, so that the relay node 50C may decrypt the encrypted data information based on a private key of the relay node 50C, to obtain the to-be-transferred data information after the decryption.

Further, the second relay node in the second blockchain network may sign the to-be-transferred data information based on the private key of the second relay node, to obtain signature information of the to-be-transferred data information. The second node in the second blockchain network may receive the signature information transmitted by the second relay node based on a cross-chain data transfer function in the second cross-chain contract deployed on the second node. It is to be understood that the second node may obtain the public key of the second relay node in the second blockchain network, and verify the received signature information based on the public key of the second relay node, to obtain a signature verification result of the signature information. The second node may obtain the to-be-transferred data information transmitted by the second relay node in a case that the signature verification result indicates that the signature verification performed by the second node is successful.

Figure 6:
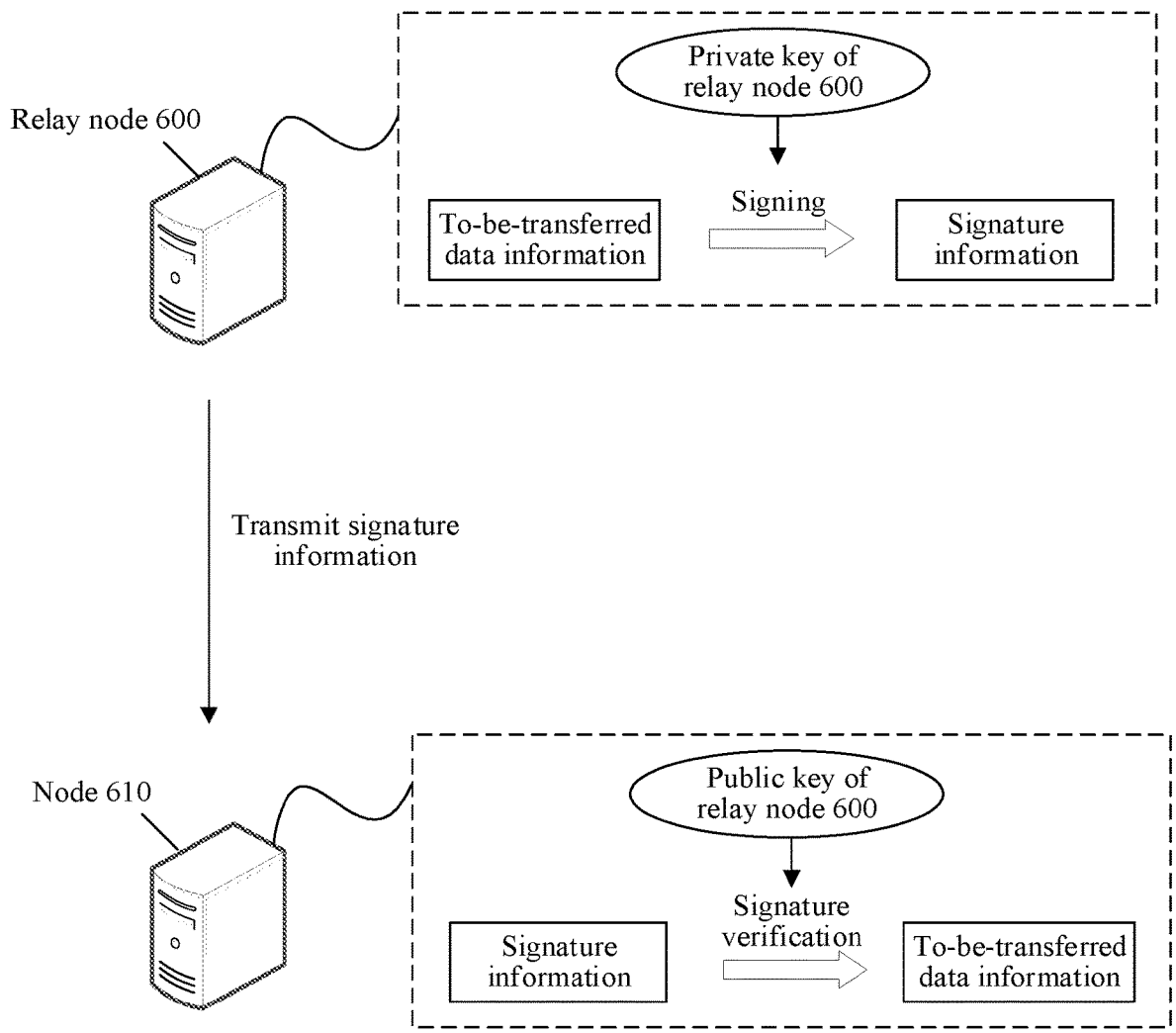
FIG. 6 is a schematic diagram showing a scenario of verifying signature information according to an embodiment of this disclosure.

For ease of understanding, further, refer to FIG. 6, which is a schematic diagram showing a scenario of verifying signature information according to an embodiment of this disclosure. As shown in FIG. 6, a relay node 600 in the embodiments of this disclosure may be a second relay node in a second blockchain network, and the second relay node may be the relay node 120A in the blockchain node system 120 shown in FIG. 1. A node 610 in the embodiments of this disclosure may be a second node in the second blockchain network, and the second node may be any node of the blockchain node system 120 shown in FIG. 1, for example, the node 1200a.

The second blockchain network may configure a public key and a private key in pair for the relay node 600. It is to be understood that the relay node 600 may sign the to-be-transferred data information based on the private key of the relay node 600, to obtain signature information. It can be understood that the relay node 600 may perform a hash operation on the to-be-transferred data information, to obtain digest information h of the to-be-transferred data information, and signs a digital signature on the digest information h based on the private key of the relay node 600, to obtain signature information. The signature information includes the digital signature and the to-be-transferred data information.

In this case, the relay node 600 may transmit the signature information to the node 610, so that the node 610 may perform signature verification on the signature information based on the public key of the relay node 600, to obtain a signature verification result. It can be understood that the node 610 may perform signature verification on the digital signature based on the public key of the relay node 600 to obtain digest information H of the to-be-transferred data information, and use the same hash algorithm as the relay node 600 to perform a hash operation on the to-be-transferred data information, to obtain the digest information h of the to-be-transferred data information. Further, the node 610 may compare the digest information H obtained after the signature verification with the digest information h obtained after the hash operation to obtain a signature verification result.

If the digest information H is different from the digest information h, it may be determined that the signature verification performed by the node 610 fails. If the digest information H is the same as the digest information h, it may be determined that the signature verification performed by the node 610 is successful, so that the to-be-transferred data information can be obtained.

Further, the second node in the second blockchain network may verify the to-be-transferred data information based on the second oracle contract deployed on the second node. It can be understood that the second node may obtain the data format of the to-be-transferred data information, and verify a degree of matching between the data format of the to-be-transferred data information and the second data format determined by the first oracle contract and the second oracle contract. It may be determined that the verification performed by the second node is successful in a case that the degree of matching indicates that the data format of the to-be-transferred data information is the second data format. It may be determined that the verification performed by the second node fails in a case that the degree of matching indicates that the data format of the to-be-transferred data information is not the second data format.

It can be understood that when the verification is successful, the second node may convert the data format of the to-be-transferred data information from the second data format (for example, binary format) to a third data format (for example, json format) to obtain target data information.

Further, the second node may write the target data information into a second blockchain corresponding to the second blockchain network. It can be understood that the second node may generate, based on the target data information, a to-be-verified block to be written into the second blockchain corresponding to the second blockchain network. Further, the second node may broadcast the to-be-verified block to all blockchain nodes on the second blockchain. The second node may write the to-be-verified block into the second blockchain in a case that all the blockchain nodes on the second blockchain reach a consensus.

As shown in FIG. 2, the node 20D may write the target data information into a second blockchain (for example, the blockchain 2 shown in FIG. 2) corresponding to the second blockchain network. It can be understood that the blockchain 2 shown in FIG. 2 may be the second blockchain corresponding to the second blockchain network corresponding to the blockchain node system 120 in FIG. 1, the blockchain 2 may be the same blockchain shared by each node in the second blockchain network corresponding to the node 20D shares, and in the blockchain 2, each node may obtain information stored in the blockchain.

The blockchain 2 includes a block 20a, a block 20b, . . . , a block 20n, and a to-be-verified block. The block 20a may be referred to as a genesis block of the blockchain 2. The to-be-verified block in the blockchain 2 includes the target data information in the third data format.

The node 20D may write the target data information into the second blockchain corresponding to the second blockchain network corresponding to the node 20D. In other words, the node 20D may obtain the block 20n with a latest generation timestamp from the blockchain 2. Further, the node 20D may generate a to-be-verified block to be written into the blockchain 2 according to the target data information. In this case, the node 20D may broadcast the to-be-verified block including the target data information to all blockchain nodes in the second blockchain network (for example, a consensus node for consensus processing). When it is determined that all the blockchain nodes reach a consensus, the to-be-verified block may be written into the blockchain 2, that is, the to-be-verified block may be used as a block next to the block 20n, so that the initial data information in the target block in the blockchain 1 may be stored to the target data information in the to-be-verified block in the blockchain 2.

In addition, the second node in the embodiments of this disclosure may further establish a mapping relationship table between the target data information and the transaction data information based on a second block height of a second block to which the target data information belongs on the second blockchain and a first block height of the first block to which the transaction data information corresponding to the target data information belongs on the first blockchain, to facilitate the second node in querying the source of the target data information, thereby improving the reliability of cross-chain information in subsequent service processing.

For ease of understanding, further, refer to Table 2, which is a mapping relationship table according to an embodiment of this disclosure. It can be understood that in the embodiments of this disclosure, a block height of the first block to which the transaction data information belongs in the first blockchain may be referred to as a first block height, and a block height of the second block to which the target data information corresponding to the transaction data information belongs in the second chain may be referred to as a second block height.

TABLE 2

| Second blockchain | | First blockchain | |
|---|---|---|---|
| Target data information | Second block height | Transaction data information | First block height |
| Target data information 1 | A | Transaction data information 1 | a |
| Target data information 2 | B | Transaction data information 2 | b |
| Target data information 3 | C | Transaction data information 3 | c |
| Target data information 4 | D | Transaction data information 4 | d |

It can be understood that the second node in the embodiments of this disclosure may establish a one-to-one mapping relationship between a plurality of pieces of target data information and transaction data information, and Table 2 above takes four pieces of transaction data information as an example to describe the mapping relationship table. As shown in Table 2 above, the second block height of the second block to which the target data information 1 belongs in the second blockchain is A, and the first block height of the first block to which the transaction data information 1 corresponding to the target data information 1 belongs in the first blockchain is a. The second block height of the second block to which the target data information 2 belongs in the second blockchain is B, and the first block height of the first block to which the transaction data information 2 corresponding to the target data information 2 belongs in the first blockchain is b. The second block height of the second block to which the target data information 3 belongs in the second blockchain is C, and the first block height of the first block to which the transaction data information 3 corresponding to the target data information 3 belongs in the first blockchain is c. The second block height of the second block to which the target data information 4 belongs in the second blockchain is D, and the first block height of the first block to which the transaction data information 4 corresponding to the target data information 4 belongs in the first blockchain is d.

It is to be understood that when the second node needs to query the source of the target data information, the second node may obtain the second block height of the second block to which the target data information belongs in the second blockchain, and then query the mapping relationship table shown in Table 2 above for the first block height of the first block to which the transaction data information corresponding to the target data information belongs in the first blockchain, so as to obtain the transaction data information. Further, the second node may compare the transaction data information with the target data information, and determine whether the target data information has been tampered with.

For example, the second block height of the second block to which the target data information 1 (for example, Zhang San) belongs in the second blockchain is 2, and the first block height of the first block to which the transaction data information 1 corresponding to the target data information 1 belongs in the first blockchain is 4. The second node may determine the first block to which the transaction data information 1 corresponding to the target data information 1 belongs based on the first block height of 4 found by querying, and obtain the transaction data information 1 (for example, zhangsan) from the first block. In this case, the second node may compare the target data information 1 with the transaction data information 1, and determine that the target data information 1 has not been tampered with.

In an embodiment, the second node may determine a service category to which the target data information belongs based on the second service contract deployed on the second node. The second node may perform a service callback on the target data information based on the service category. For example, in a judicial scenario, the second node may determine that the target data information belongs to a civil litigation case, and therefore may process the target data information according to service operations related to civil litigation.

In the embodiments of this disclosure, a first node in a first blockchain network can obtain initial data information in a first data format from a first relay node in the first blockchain network according to a first oracle contract deployed on the first node. The initial data information is determined according to transaction data information in a target block on a first blockchain corresponding to the first blockchain network that is detected by the first relay node. Further, when the first node successfully verifies the initial data information, the first node may convert the data format of the initial data information into a second data format specified by the first oracle contract and a second oracle contract, and then the first relay node may transmit to-be-transferred data information in the second data format to a second relay node in a second blockchain network, so that the second relay node stores data in the to-be-transferred data information based on a second node in the second blockchain network. In addition, transaction data information in the second blockchain may also be stored in the first blockchain. It can be seen that the embodiments of this disclosure can implement the mutual storage of information across blockchains.

Figure 7:
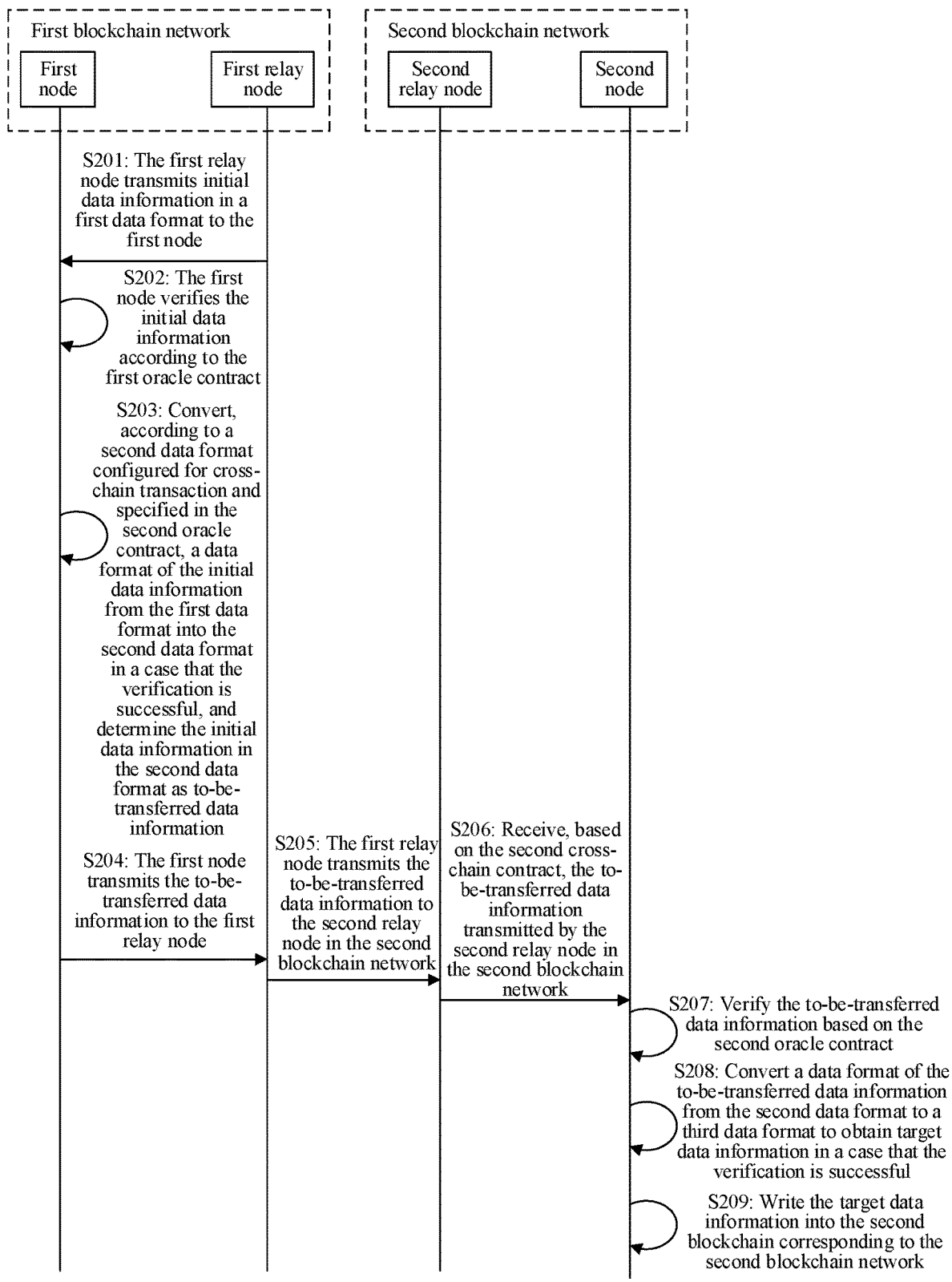
FIG. 7 is a schematic flowchart of a cross-blockchain data mutual storage method according to an embodiment of this disclosure.

Further, FIG. 7 is a schematic flowchart of a cross-blockchain data mutual storage method according to an embodiment of this disclosure. This method may be performed by interaction between a first node and a first relay node in a first blockchain network and a second node and a second relay node in a second blockchain network. The first node may be the node 20B shown in FIG. 2 above, the first relay node may be the node 20A shown in FIG. 2 above, the second node may be the node 20D shown in FIG. 2 above, and the second relay node may be the node 20C shown in FIG. 2 above. As shown in FIG. 7, the method may include the following steps:

In step S201, the first relay node transmits initial data information (i.e., initial data) in a first data format to the first node.

Specifically, the first node in the first blockchain network may determine, from the first blockchain network, a relay node having a network connection relationship with the first node. In the embodiments of this disclosure, a relay node having a network connection relationship with the first node in the first blockchain network may be referred to as a first relay node. It can be understood that the first relay node may detect transaction data information in a target block on a first blockchain corresponding to the first blockchain network. The target block may be a block with a latest generation timestamp in the first blockchain. Further, the first node may obtain the transaction data information, and then may determine a data format of the transaction data information as a first data format and determine the transaction data information in the first data format as initial data information. The first data format may be a data format used by each node of the first blockchain network for data information exchange. Further, the first node may invoke a first oracle contract deployed on the first node, so as to obtain the initial data information from the first relay node. The transaction data information is determined based on the first service contract in the first node.

It is to be understood that the first node in this embodiment of this disclosure may be the node 20B shown in FIG. 2, and the node 20B may be any node in the blockchain node system 110 shown in FIG. 1, for example, the node 1100a. The first relay node in this embodiment of this disclosure may be the node 20A shown in FIG. 2, and the node 20A may be the relay node 110A in the blockchain node system 110 shown in FIG. 1. The second node in this embodiment of this disclosure may be the node 20D shown in FIG. 2, and the node 20D may be any node in the blockchain node system 120 shown in FIG. 1, for example, the node 1200a. The second relay node in this embodiment of this disclosure may be the node 20C shown in FIG. 2, and the node 20C may be the relay node 120A in the blockchain node system 120 shown in FIG. 1.

A service contract such as the first service contract, a first cross-chain contract, or the first oracle contract may be deployed on the first node. A blockchain network corresponding to the first node may be referred to as a first blockchain network, and a blockchain corresponding to the first blockchain network may be referred to as a first blockchain. A service contract such as a second service contract, a second cross-chain contract, or a second oracle contract may be deployed on the second node. A blockchain network corresponding to the second node may be referred to as a second blockchain network, and a blockchain corresponding to the second blockchain network may be referred to as a second blockchain. It is to be understood that the blockchain types of the first blockchain and the second blockchain may be the same or different, which is not limited herein. For example, the first blockchain may be a Bitcoin blockchain, and the second blockchain may be an Ethereum blockchain.

In step S202, the first node verifies the initial data information according to the first oracle contract.

Specifically, the first node may invoke a data verification function in the first oracle contract to verify an attribute of the data format of the initial data information. It can be understood that if the attribute of the data format of the initial data information conforms to an attribute of the first data format used for data transaction in the first blockchain network, it may be determined that the verification performed by the first node is successful; and if the attribute of the data format of the initial data information does not conform to the attribute of the first data format used for data transaction in the first blockchain network, it may be determined that the verification performed by the first node fails.

In step S203, in response to a determination that the verification was successful, the first node converts, according to a second data format configured for cross-chain transaction and specified in the second oracle contract, the initial data information from the first data format into the second data format, and determines the initial data information in the second data format as to-be-transferred data information (i.e., to-be-transferred data), the second oracle contract being deployed on a second node in a second blockchain network.

Specifically, when the first node successfully verifies the initial data information, the first node may obtain the second oracle contract included in the second node in the second blockchain network different from the first blockchain network. Further, the first node may obtain the data format used for cross-chain transaction specified by the first oracle contract and the second oracle contract, and determine the data format used for cross-chain transaction as the second data format. In this case, the first node may convert the data format of the initial data information from the first data format to the second data format, and determine the initial data information in the second data format as to-be-transferred data information.

In step S204, the first node transmits the to-be-transferred data information to the first relay node.

Specifically, the first node may obtain the first cross-chain contract deployed on the first node, and invoke a cross-chain data transfer function in the first cross-chain contract to transmit the to-be-transferred data information to the first relay node.

In step S205, the first relay node transmits the to-be-transferred data information to the second relay node in the second blockchain network.

Specifically, the first relay node may obtain a public key of the second relay node in the second blockchain network, and encrypt the to-be-transferred data information based on the public key of the second relay node, to obtain encrypted data information. Further, the first relay node may transmit the encrypted data information to the second relay node, so that the second relay node may decrypt the encrypted data information based on a private key of the second relay node, to obtain the to-be-transferred data information.

In step S206, the second node receives, based on the second cross-chain contract, the to-be-transferred data information transmitted by the second relay node in the second blockchain network.

Specifically, the second relay node in the second blockchain network may sign the to-be-transferred data information based on the private key of the second relay node, to obtain signature information of the to-be-transferred data information. The second node in the second blockchain network may receive the signature information transmitted by the second relay node based on a cross-chain data transfer function in the second cross-chain contract deployed on the second node. It is to be understood that the second node may obtain the public key of the second relay node in the second blockchain network, and verify the received signature information based on the public key of the second relay node, to obtain a signature verification result of the signature information. The second node may obtain the to-be-transferred data information transmitted by the second relay node in a case that the signature verification result indicates that the signature verification performed by the second node is successful.

In step S207, the to-be-transferred data information is verified based on the second oracle contract.

Specifically, the second node may obtain the data format of the to-be-transferred data information, and verify a degree of matching between the data format of the to-be-transferred data information and the second data format determined by the first oracle contract and the second oracle contract. It may be determined that the verification performed by the second node is successful in a case that the degree of matching indicates that the data format of the to-be-transferred data information is the second data format. It may be determined that the verification performed by the second node fails in a case that the degree of matching indicates that the data format of the to-be-transferred data information is not the second data format.

In step S208, a data format of the to-be-transferred data information is converted from the second data format to a third data format to obtain target data information in response to a determination that the verification is successful.

In step S209, the target data information is written into the second blockchain corresponding to the second blockchain network.

Specifically, the second node may generate, based on the target data information, a to-be-verified block to be written into the second blockchain corresponding to the second blockchain network. Further, the second node may broadcast the to-be-verified block to all blockchain nodes on the second blockchain. The second node may write the to-be-verified block into the second blockchain in a case that all the blockchain nodes on the second blockchain reach a consensus.

For specific implementations of step S201 to step S209, reference may be made to the description of step S101 to step S104 in the embodiment corresponding to FIG. 3, which will not be repeated here.

It is to be understood that the number of relay nodes in the embodiments of this disclosure may be one or more. In other words, the first relay node in the first blockchain network and the second relay node in the second blockchain network may be the same relay node.

Figure 8:
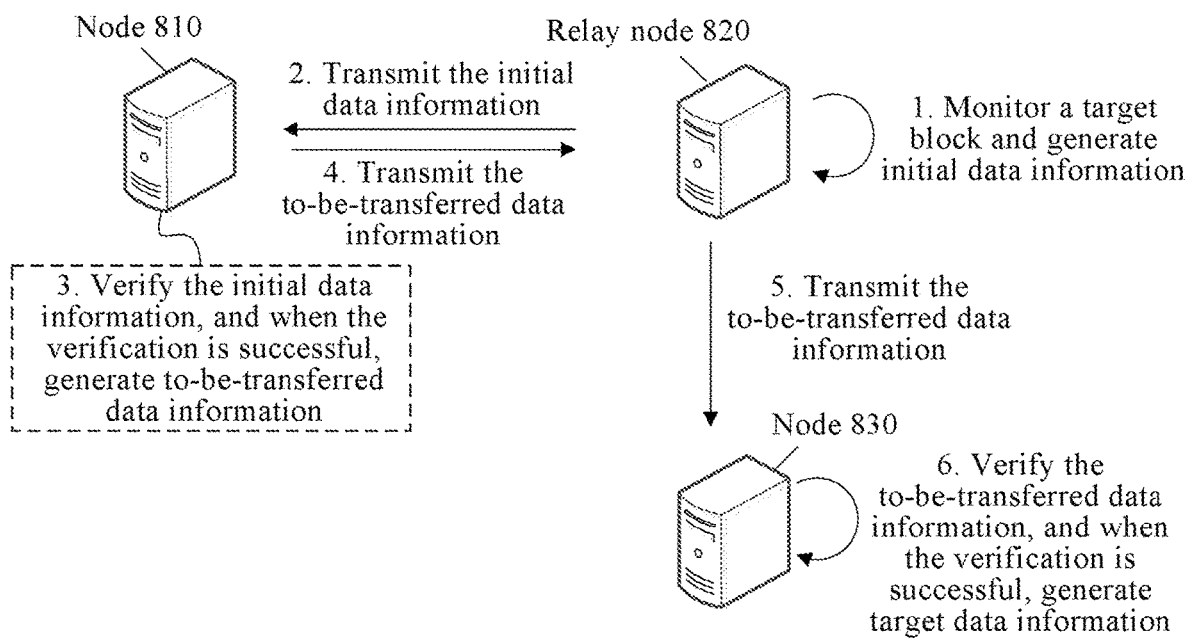
FIG. 8 is a schematic diagram showing a scenario of storing information across blockchains according to an embodiment of this disclosure.

For ease of understanding, further, refer to FIG. 8, which is a schematic diagram showing a scenario of storing information across blockchains according to an embodiment of this disclosure. As shown in FIG. 8, a node 810 in the embodiments of this disclosure may be a first node in the first blockchain network, and the first node may be any node of the blockchain node system 110 shown in FIG. 1, for example, the node 1100a. A node 830 in the embodiments of this disclosure may be a second node in the second blockchain network, and the second node may be any node of the blockchain node system 120 shown in FIG. 1, for example, the node 1200a. The relay node 820 in the embodiments of this disclosure may be a relay node participating in both the first blockchain network and the second blockchain network.

It is to be understood that the first oracle contract in the first blockchain network may be deployed on the relay node 820, so that the relay node 820 can monitor a target block in the first blockchain corresponding to the first blockchain network based on the first oracle contract, and generate initial data information based on transaction data information in the target block. Further, the relay node 820 may transmit the initial data information to the node 810 so that the node 810 may verify the initial data information.

When the verification is successful, the node 810 may convert the initial data information in the first data format into the to-be-transferred data information in the second data format. The second data format is determined by the first oracle contract deployed on the node 810 and the second oracle contract deployed on the node 830. Further, the node 810 may transmit the to-be-transferred data information to the relay node 820. In this case, the relay node 820 may transmit the to-be-transferred data information to the node 830, so that the node 830 verifies the to-be-transferred data information. When the verification performed by the node 830 is successful, the to-be-transferred data information in the second data format may be converted into the target data information in the third data format, so that the node 830 may write the target data information into the second blockchain corresponding to the second blockchain network.

In an embodiment, the second oracle contract in the second blockchain network may further be deployed on the relay node 820, so that the relay node 820 may monitor a block generation status of the second blockchain corresponding to the second blockchain network, and then upload the transaction data information of the target block in the second blockchain to the first blockchain corresponding to the first blockchain network through the node 810, so as to implement the mutual storage of data across blockchains.

In the embodiments of this disclosure, a first node in a first blockchain network can obtain initial data information in a first data format from a first relay node in the first blockchain network according to a first oracle contract deployed on the first node. The initial data information is determined according to transaction data information in a target block on a first blockchain corresponding to the first blockchain network that is detected by the first relay node. Further, when the first node successfully verifies the initial data information, the first node may convert the data format of the initial data information into a second data format specified by the first oracle contract and a second oracle contract, and then the first relay node may transmit to-be-transferred data information in the second data format to a second relay node in a second blockchain network, so that the second relay node stores data in the to-be-transferred data information based on a second node in the second blockchain network. In addition, transaction data information in the second blockchain may also be stored in the first blockchain. It can be seen that the embodiments of this disclosure can implement the mutual storage of information across blockchains.

Figure 9:
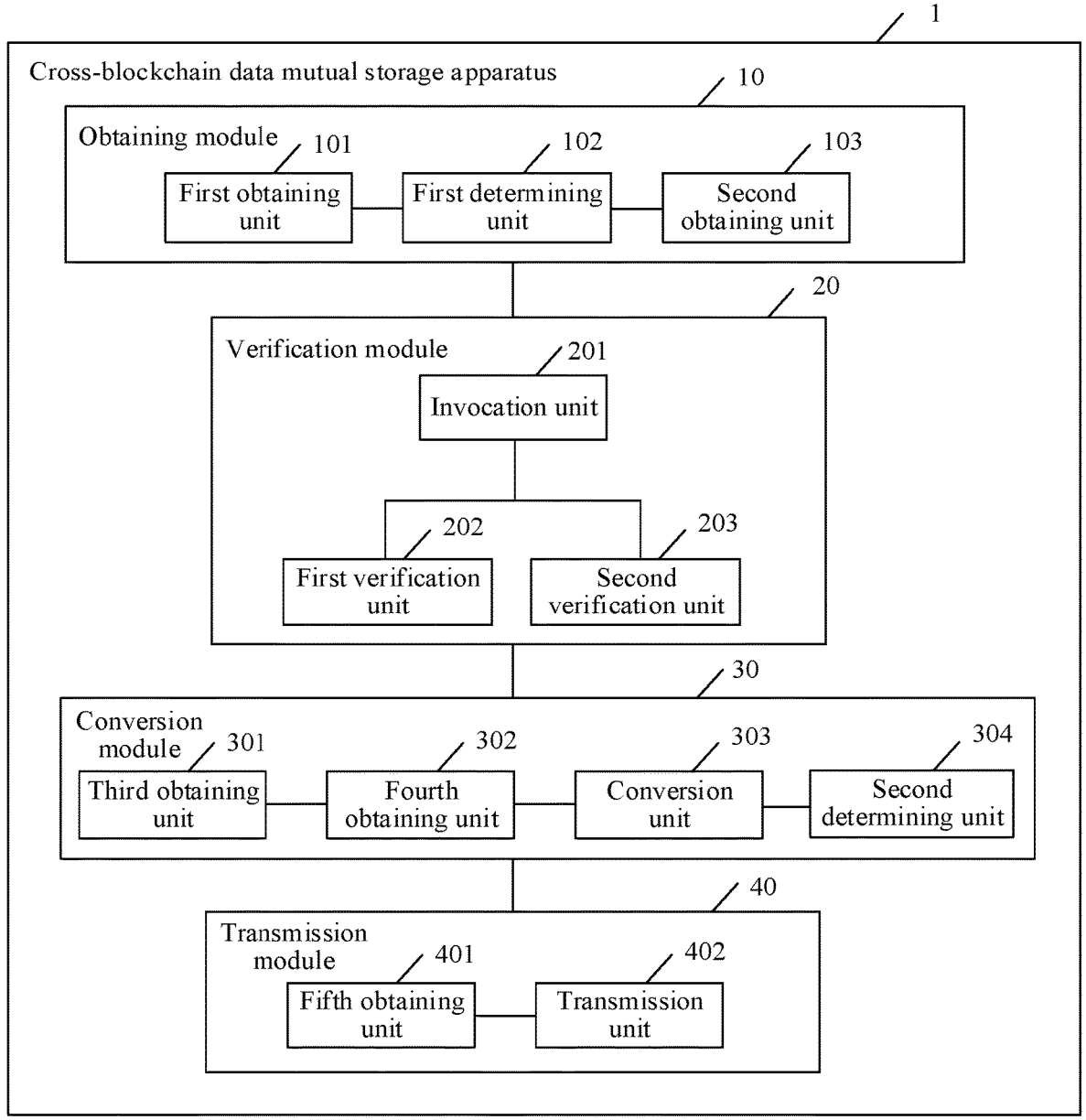
FIG. 9 is a schematic structural diagram of a cross-blockchain data mutual storage apparatus according to an embodiment of this disclosure.

Further, FIG. 9 is a schematic structural diagram of a cross-blockchain data mutual storage apparatus according to an embodiment of this disclosure. The cross-blockchain data mutual storage apparatus may be a computer program (including program code) running in a computer device. For example, the cross-blockchain data mutual storage apparatus is application software. The cross-blockchain data mutual storage apparatus may be configured to perform corresponding steps in the method provided in the embodiments of this disclosure. As shown in FIG. 9, the cross-blockchain data mutual storage apparatus 1 may run on a first node in a first blockchain network, and the first node may be the node 20B in the foregoing embodiment corresponding to FIG. 2. The cross-blockchain data mutual storage apparatus 1 may include: an obtaining module 10, a verification module 20, a conversion module 30, and a transmission module 40. One or more modules and units of the apparatus can be implemented by processing circuitry, software, or a combination thereof, for example.

The obtaining module 10 is configured to obtain initial data information in a first data format from a first relay node in the first blockchain network, the first blockchain network being corresponds to a first blockchain, and the initial data information including transaction data information in a target block on the first blockchain.

The obtaining module 10 includes a first obtaining unit 101, a first determining unit 102, and a second obtaining unit 103.

The first obtaining unit 101 is configured to determine the first relay node that has a network connection relationship with the first node in the first blockchain network, and obtain transaction data information in the target block detected by the first relay node, the transaction data information being determined according to a first service contract in the first node.

The first determining unit 102 is configured to determine a data format of the transaction data information as the first data format, and determine the transaction data information in the first data format as the initial data information.

The second obtaining unit 103 is configured to invoke the first oracle contract, and obtaining the initial data information in the first data format from the first relay node.

For specific implementations of the first obtaining unit 101, the first determining unit 102, and the second obtaining unit 103, reference may be made to the description of step S101 in the embodiment corresponding to FIG. 3, which will not be repeated here.

The verification module 20 is configured to verify the initial data information according to a first oracle contract included in the first node.

The verification module 20 includes an invocation unit 201, a first verification unit 202, and a second verification unit 203.

The invocation unit 201 is configured to invoke a data verification function in the first oracle contract to verify an attribute of the data format of the initial data information.

The first verification unit 202 is configured to determine that the verification is successful in a case that the attribute of the data format of the initial data information conforms to an attribute of the first data format used for data transaction in the first blockchain network.

The second verification unit 203 is configured to determine that the verification fails in a case that the attribute of the data format of the initial data information does not conform to an attribute of the first data format used for data transaction in the first blockchain network.

For specific implementations of the invocation unit 201, the first verification unit 202, and the second verification unit 203, reference may be made to the description of step S102 in the embodiment corresponding to FIG. 3, which will not be repeated here.

The conversion module 30 is configured to convert, according to a second data format configured for cross-chain transaction and specified in a second oracle contract that has an association relationship with the first oracle contract, a data format of the initial data information from the first data format into the second data format in a case that the verification is successful, and determine the initial data information in the second data format as to-be-transferred data information, the second oracle contract being deployed on a second node in a second blockchain network, and the first blockchain network being different from the second blockchain network.

The conversion module 30 includes a third obtaining unit 301, a fourth obtaining unit 302, a conversion unit 303, and a second determining unit 304.

The third obtaining unit 301 is configured to obtain the second oracle contract included in the second node in a case that the verification is successful.

The fourth obtaining unit 302 is configured to determine a data format configured for cross-chain transaction specified in the first oracle contract and the second oracle contract as the second data format.

The conversion unit 303 is configured to convert the data format of the initial data information from the first data format to the second data format.

The second determining unit 304 is configured to determine the initial data information in the second data format as the to-be-transferred data information.

For specific implementations of the third obtaining unit 301, the fourth obtaining unit 302, the conversion unit 303, and the second determining unit 304, reference may be made to the description of step S103 in the embodiment corresponding to FIG. 3, which will not be repeated here.

The transmission module 40 is configured to transmit the to-be-transferred data information to the first relay node, so that the first relay node transmits the to-be-transferred data information to the second node for storage of data in the to-be-transferred data information.

The transmission module 40 includes a fifth obtaining unit 401 and a transmission unit 402.

The fifth obtaining unit 401 is configured to obtain a first cross-chain contract deployed on the first node.

The transmission unit 402 is configured to invoke a cross-chain data transfer function in the first cross-chain contract, and transmit the to-be-transferred data information to the first relay node, so that the first relay node encrypts the to-be-transferred data information based on a public key of a second relay node in the second blockchain network to obtain encrypted data information and transmits the encrypted data information to the second relay node, the second relay node decrypts the encrypted data information based on a private key of the second relay node, and the second node stores data in the to-be-transferred data information obtained by the description.

For specific implementations of the fifth obtaining unit 401 and the transmission unit 402, reference may be made to the description of step S104 in the embodiment corresponding to FIG. 3, which will not be repeated here.

For specific implementations of the obtaining module 10, the verification module 20, the conversion module 30 and the transmission module 40, reference may be made to the description of step S101 to step S104 in the embodiment corresponding to FIG. 3, which will not be repeated here. In addition, the description of beneficial effects of the same method are not described herein again.

Figure 10:
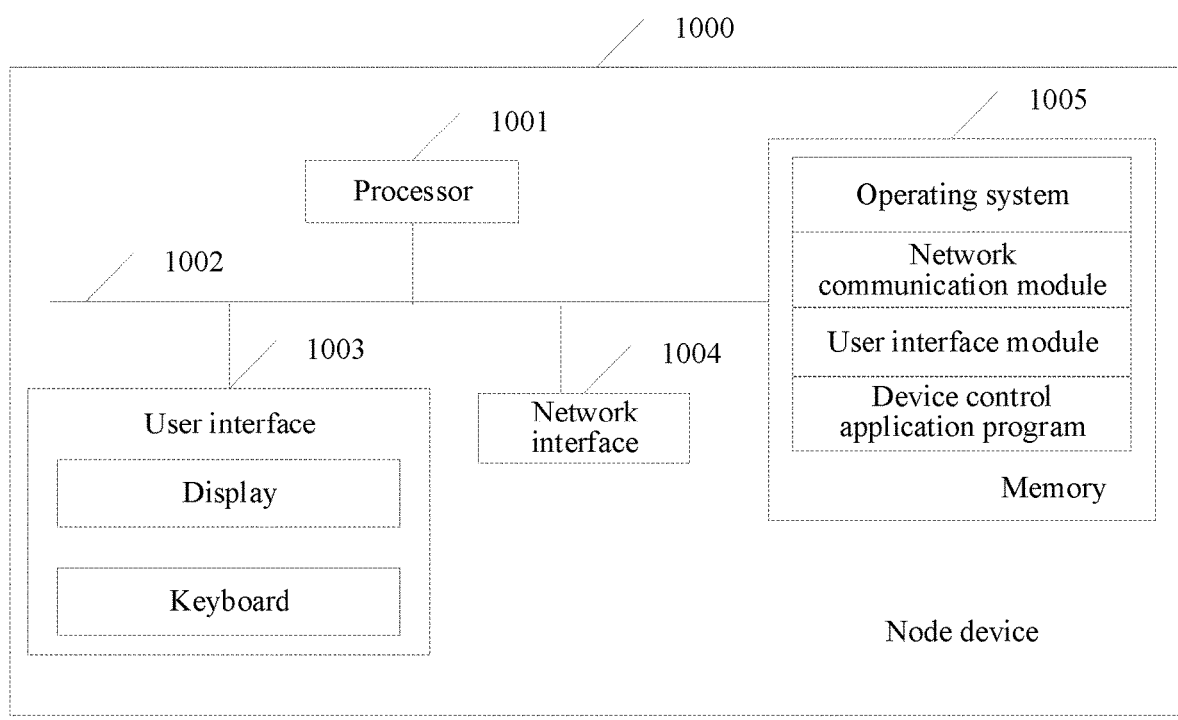
FIG. 10 is a schematic diagram of a node device according to an embodiment of this disclosure.

Further, FIG. 10 is a schematic diagram of a node device according to an embodiment of this disclosure. As shown in FIG. 10, the node device 1000 may be the node 20B in the foregoing embodiment corresponding to FIG. 2, and the node device 1000 may include processing circuitry (e.g., at least one processor 1001 (for example CPU)), at least one network interface 1004, a user interface 1003, a memory 1005 (i.e., a non-transitory computer-readable storage medium), and at least one communication bus 1002. The communication bus 1002 is configured to implement connection and communication between these components. The user interface 1003 may include a display and a keyboard, and the network interface 1004 may include a standard wired interface or wireless interface (for example, a WI-FI interface). The memory 1005 may be a high-speed random access memory (RAM), or a non-volatile memory, for example, at least one disk memory. In an embodiment, the memory 1005 may also be at least one storage device located remotely from the processor 1001. As shown in FIG. 10, the memory 1005 as a computer storage medium may include an operating system, a network communication module, a user interface module, and a device control application program.

In the node device 1000 shown in FIG. 10, the network interface 1004 is mainly configured for network communication with a first relay node; the user interface 1003 is mainly configured to provide an input interface for a user; and the processor 1001 may be configured to call the device control application program stored in the memory 1005 to implement operations of: obtaining initial data information in a first data format from a first relay node in the first blockchain network, the first blockchain network being corresponds to a first blockchain, and the initial data information including transaction data information in a target block on the first blockchain; verifying the initial data information according to a first oracle contract included in the first node; converting, according to a second data format configured for cross-chain transaction and specified in a second oracle contract that has an association relationship with the first oracle contract, a data format of the initial data information from the first data format into the second data format in a case that the verification is successful, and determining the initial data information in the second data format as to-be-transferred data information, the second oracle contract being deployed on a second node in a second blockchain network; and transmitting the to-be-transferred data information to the first relay node, so that the first relay node transmits the to-be-transferred data information to the second node for storage of data in the to-be-transferred data information.

It is to be understood that the node device 1000 described in the embodiments of this disclosure may execute the description of the cross-blockchain data mutual storage method in the foregoing embodiments corresponding to FIG. 3 and FIG. 7 or may also execute the description of the cross-blockchain data mutual storage apparatus 1 in the foregoing embodiment corresponding to FIG. 9, which will not be repeated here. In addition, the description of beneficial effects of the same method are not described herein again.

In addition, it is to be pointed out that the embodiments of this disclosure further provide a computer-readable storage medium. The computer-readable storage medium stores a computer program configured to be executed by the cross-blockchain data mutual storage apparatus 1 mentioned above. The computer program includes program instructions. When executing the program instructions, the processor can execute the description of the cross-blockchain data mutual storage method in the foregoing embodiment corresponding to FIG. 3 or FIG. 7, which will not be repeated here. In addition, the description of beneficial effects of the same method are not described herein again. For technical details that are not disclosed in the embodiments of the computer-readable storage medium of this disclosure, refer to the method embodiments of this disclosure. By way of example, the program instructions may be deployed to be executed by one computing device, or by a plurality of computing devices located at a same location, or by a plurality of computing devices distributed at a plurality of locations and interconnected via a communication network. The plurality of computing devices distributed at the plurality of locations and interconnected via the communication network can form a blockchain system.

Figure 11:
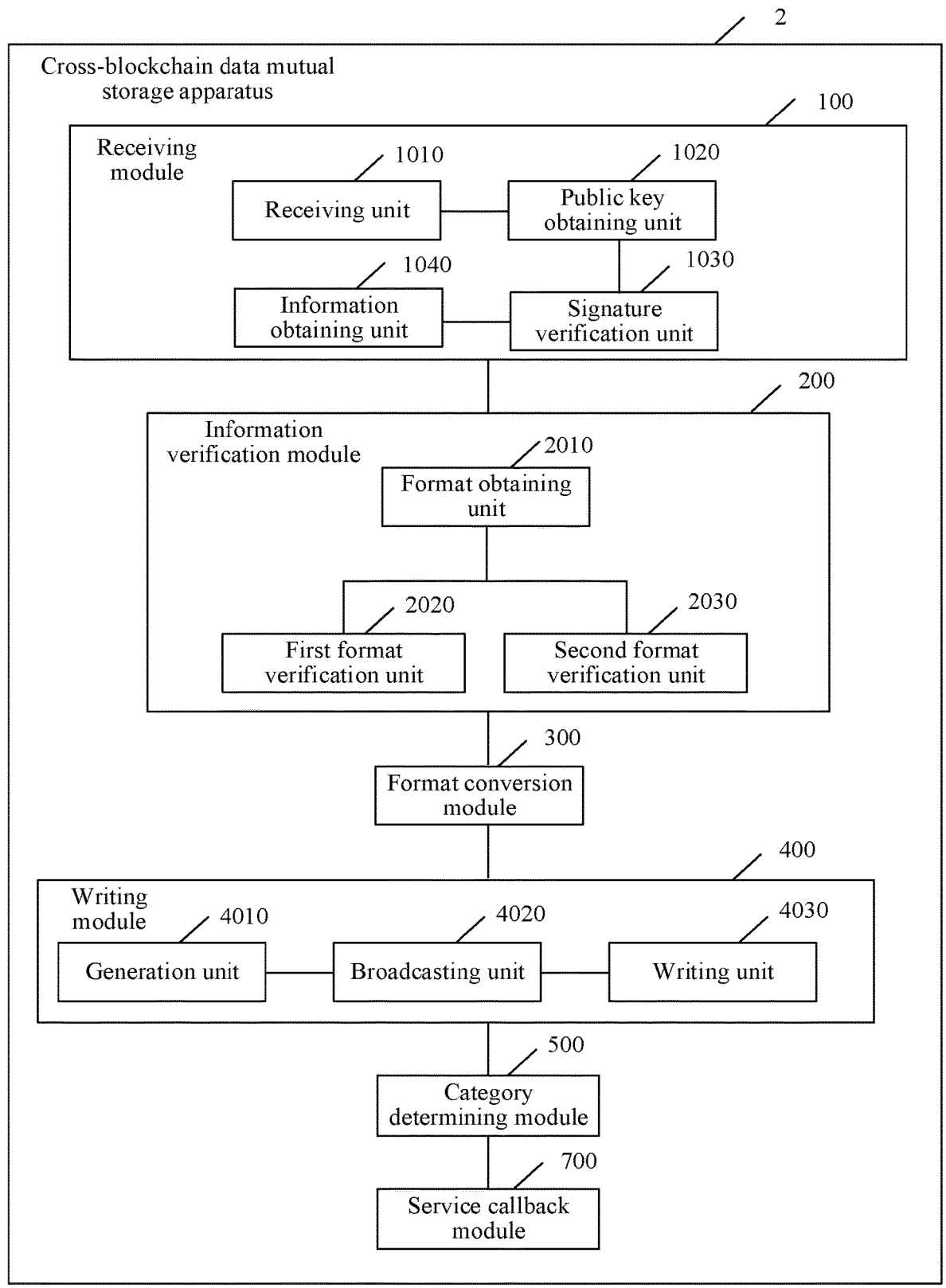
FIG. 11 is a schematic structural diagram of a cross-blockchain data mutual storage apparatus according to an embodiment of this disclosure.

Further, FIG. 11 is a schematic structural diagram of a cross-blockchain data mutual storage apparatus according to an embodiment of this disclosure. The cross-blockchain data mutual storage apparatus may be a computer program (including program code) running in a computer device. For example, the cross-blockchain data mutual storage apparatus is application software. The cross-blockchain data mutual storage apparatus may be configured to perform corresponding steps in the method provided in the embodiments of this disclosure. As shown in FIG. 11, the cross-blockchain data mutual storage apparatus 2 may run on a second node in a second blockchain network, and the second node may be the node 20D in the foregoing embodiment corresponding to FIG. 2. The cross-blockchain data mutual storage apparatus 2 may include a receiving module 100, an information verification module 200, a format conversion module 300, a writing module 400, a category determining module 500, and a service callback module 700. One or more modules or units of the apparatus can be implemented by processing circuitry, software, or a combination thereof, for example.

The receiving module 100 is configured to receive, based on a second cross-chain contract included in the second node, to-be-transferred data information transmitted by a second relay node on the second blockchain network, the to-be-transferred data information being transmitted from a first relay node in a first blockchain network different from the second blockchain network to the second relay node, a first node in the first blockchain network including a first oracle contract and a first cross-chain contract, the second node including a second oracle contract, the to-be-transferred data information being determined by the first node converting a format of initial data information in a first data format based on a second data format specified in the second oracle contract that has an association relationship with the first oracle contract, and the first node being configured to transmit the to-be-transferred data information to the first relay node according to the first cross-chain contract.

The receiving module 100 includes a receiving unit 1010, a public key obtaining unit 1020, a signature verification unit 1030, and an information obtaining unit 1040.

The receiving unit 1010 is configured to invoke a cross-chain data transfer function in the second cross-chain contract to receive signature information obtained by the second relay node by signing the to-be-transferred data information based on a private key of the second relay node, the to-be-transferred data information being obtained by the second relay node by decrypting encrypted data information based on the private key of the second relay node, and the encrypted data information being obtained by the first relay node in the first blockchain network by encrypting to-be-transferred data information based on a public key of the second relay node.

The public key obtaining unit 1020 is configured to obtain the public key of the second relay node in the second blockchain network.

The signature verification unit 1030 is configured to perform signature verification on the signature information based on the public key to obtain a signature verification result, the signature verification result including the to-be-transferred data information.

The information obtaining unit 1040 is configured to obtain the to-be-transferred data information transmitted by the second relay node in a case that the signature verification result indicates that the signature verification is successful.

For specific implementations of the receiving unit 1010, the public key obtaining unit 1020, the signature verification unit 1030, and the information obtaining unit 1040, reference may be made to the description of step S206 in the embodiment corresponding to FIG. 7, which will not be repeated here.

The information verification module 200 is configured to verify the to-be-transferred data information based on the second oracle contract.

The information verification module 200 includes a format obtaining unit 2010, a first format verification unit 2020, and a second format verification unit 2030.

The format obtaining unit 2010 is configured to obtain the data format of the to-be-transferred data information, and verify a degree of matching between the data format of the to-be-transferred data information and the second data format determined by the second oracle contract.

The first format verification unit 2020 is configured to determine that the verification is successful in a case that the degree of matching indicates that the data format of the to-be-transferred data information is the second data format.

The second format verification unit 2030 is configured to determine that the verification fails in a case that the degree of matching indicates that the data format of the to-be-transferred data information is not the second data format.

For specific implementations of the format obtaining unit 2010, the first format verification unit 2020, and the second format verification unit 2030, reference may be made to the description of step S207 in the embodiment corresponding to FIG. 7, which will not be repeated here.

The format conversion module 300 is configured to convert a data format of the to-be-transferred data information from the second data format to a third data format to obtain target data information in a case that the verification is successful.

The writing module 400 is configured to write the target data information into a second blockchain corresponding to the second blockchain network.

The writing module 400 includes a generation unit 4010, a broadcasting unit 4020, and a writing unit 4030.

The generation unit 4010 is configured to generate, based on the target data information, a to-be-verified block to be written into the second blockchain corresponding to the second blockchain network.

The broadcasting unit 4020 is configured to broadcast the to-be-verified block to all blockchain nodes on the second blockchain.

The writing unit 4030 is configured to write the to-be-verified block into the second blockchain in a case that all the blockchain nodes on the second blockchain reach a consensus.

For specific implementations of the generation unit 4010, the broadcasting unit 4020, and the writing unit 4030, reference may be made to the description of step S209 in the embodiment corresponding to FIG. 7, which will not be repeated here.

The category determining module 500 is configured to determine a service category to which the target data information belongs based on a second service contract included in the second node.

The service callback module 700 is configured to perform a service callback on the target data information based on the service category.

For specific implementations of the receiving module 100, the information verification module 200, the format conversion module 300, the writing module 400, the category determining module 500, and the service callback module 700, reference may be made to the description of step S201 to step S209 in the embodiment corresponding to FIG. 7, which will not be repeated here. In addition, the description of beneficial effects of the same method are not described herein again.

Figure 12:
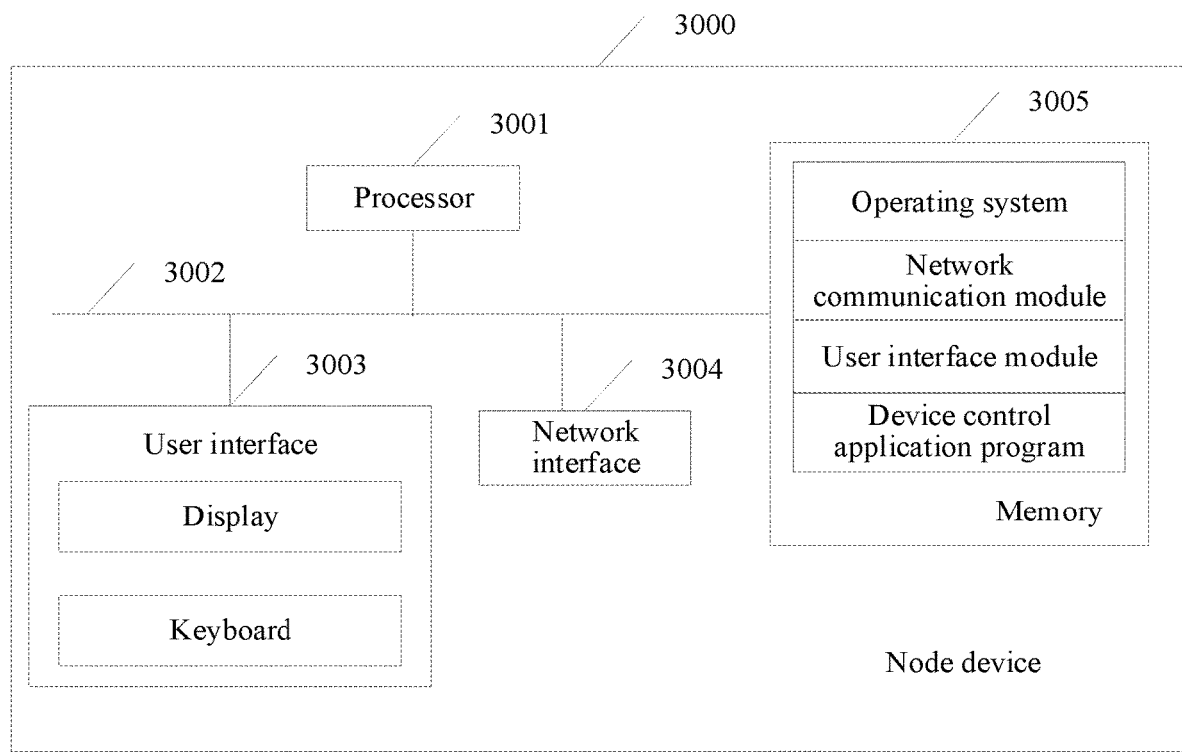
FIG. 12 is a schematic diagram of a node device according to an embodiment of this disclosure.

Further, FIG. 12 is a schematic diagram of a node device according to an embodiment of this disclosure. As shown in FIG. 12, the node device 3000 may be the node 20D in the foregoing embodiment corresponding to FIG. 2, and the node device 3000 may include at least one processor 3001 (for example, CPU), at least one network interface 3004, a user interface 3003, a memory 3005, and at least one communication bus 3002. The communication bus 3002 is configured to implement connection and communication between these components. The user interface 3003 may include a display and a keyboard, and the network interface 3004 may include a standard wired interface or wireless interface (for example, a WI-FI interface). The memory 3005 may be a high-speed random access memory (RAM), or a non-volatile memory, for example, at least one disk memory. In an embodiment, the memory 3005 may also be at least one storage device located remotely from the processor 3001. As shown in FIG. 12, the memory 3005 as a computer storage medium may include an operating system, a network communication module, a user interface module, and a device control application program.

In the node device 3000 shown in FIG. 12, the network interface 3004 is mainly configured for network communication with a second relay node; the user interface 3003 is mainly configured to provide an input interface for a user; and the processor 3001 may be configured to call the device control application program stored in the memory 3005 to implement operations of: receiving, based on a second cross-chain contract included in the second node, to-be-transferred data information transmitted by a second relay node on the second blockchain network, the to-be-transferred data information being transmitted from a first relay node in a first blockchain network different from the second blockchain network to the second relay node, a first node in the first blockchain network including a first oracle contract and a first cross-chain contract, the second node including a second oracle contract, the to-be-transferred data information being determined by the first node converting a format of initial data information in a first data format based on a second data format specified in the second oracle contract that has an association relationship with the first oracle contract, and the first node being configured to transmit the to-be-transferred data information to the first relay node according to the first cross-chain contract; verifying the to-be-transferred data information based on the second oracle contract; converting a data format of the to-be-transferred data information from the second data format to a third data format to obtain target data information in a case that the verification is successful; and writing the target data information into a second blockchain corresponding to the second blockchain network.

It is to be understood that the node device 3000 described in the embodiments of this disclosure may execute the description of the cross-blockchain data mutual storage method in the foregoing embodiment corresponding to FIG. 7 or may also execute the description of the cross-blockchain data mutual storage apparatus 2 in the foregoing embodiment corresponding to FIG. 11, which will not be repeated here. In addition, the description of beneficial effects of the same method are not described herein again.

In addition, it is to be pointed out that the embodiments of this disclosure further provide a computer-readable storage medium. The computer-readable storage medium stores a computer program configured to be executed by the cross-blockchain data mutual storage apparatus 2 mentioned above. The computer program includes program instructions. When executing the program instructions, the processor can execute the description of the cross-blockchain data mutual storage method in the foregoing embodiment corresponding to FIG. 7, which will not be repeated here. In addition, the description of beneficial effects of the same method are not described herein again. For technical details that are not disclosed in the embodiments of the computer-readable storage medium of this disclosure, refer to the method embodiments of this disclosure. By way of example, the program instructions may be deployed to be executed by one computing device, or by a plurality of computing devices located at a same location, or by a plurality of computing devices distributed at a plurality of locations and interconnected via a communication network. The plurality of computing devices distributed at the plurality of locations and interconnected via the communication network can form a blockchain system.

Figure 13:
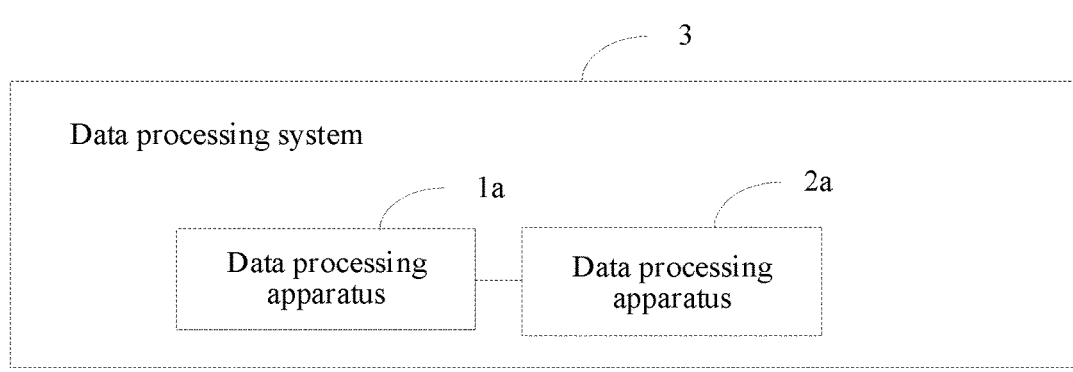
FIG. 13 is a schematic structural diagram of a data processing system according to an embodiment of this disclosure.

Further, FIG. 13 is a schematic structural diagram of a data processing system according to an embodiment of this disclosure. The data processing system 3 may include a data processing apparatus 1a and a data processing apparatus 2a. The data processing apparatus 1a may be the cross-blockchain data mutual storage apparatus 1 in the foregoing embodiment corresponding to FIG. 9. It can be understood that the data processing apparatus 1a may be integrated the node 20B in the foregoing embodiment corresponding to FIG. 2, so the details will not be described in detail here. The data processing apparatus 2a may be the cross-blockchain data mutual storage apparatus 2 in the foregoing embodiment corresponding to FIG. 11. It can be understood that the data processing apparatus 2a may be integrated the node 20D in the foregoing embodiment corresponding to FIG. 2, so the details will not be described in detail here. In addition, the description of beneficial effects of the same method are not described herein again. For technical details not disclosed in the embodiments of the data processing system involved in this disclosure, refer to the description of the method embodiments of this disclosure.

A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

What is disclosed above is merely exemplary embodiments of this disclosure, and is not intended to limit the scope of this disclosure. Therefore, equivalent variations made in accordance with this disclosure shall fall within the scope of this disclosure.

What is claimed is:

1. A cross-blockchain mutual data storage method, comprising:
   obtaining, by processing circuitry of a first node in a first blockchain network, initial data in a first data format from a first relay node in the first blockchain network, the first blockchain network corresponding to a first blockchain, and the initial data including transaction data in a target block in the first blockchain;
   verifying the initial data according to a first oracle contract in the first node;
   in response to a determination that the verification was successful, converting, according to a second data format configured for cross-chain transaction and specified in a second oracle contract associated with the first oracle contract, the initial data from the first data format into the second data format, and determining the initial data in the second data format as to-be-transferred data, the second oracle contract being deployed on a second node in a second blockchain network; and
   transmitting the to-be-transferred data to the first relay node by:
      obtaining a first cross-chain contract deployed in the first node;
      invoking a cross-chain data transfer function in the first cross-chain contract; and
      transmitting the to-be-transferred data to the first relay node,
   wherein the first relay node encrypts the to-be-transferred data based on a public key of a second relay node in the second blockchain network to obtain encrypted data and transmits the encrypted data to the second relay node,
   wherein the second relay node decrypts the encrypted data based on a private key of the second relay node to generate the to-be-transferred data and provides the to-be-transferred data to the second node, and
   wherein the second node stores the to-be-transferred data.

2. The cross-blockchain mutual data storage method according to claim 1, wherein the obtaining comprises:
   determining the first relay node that has a network connection relationship with the first node in the first blockchain network, and obtaining the transaction data in the target block, the transaction data being determined according to a first service contract in the first node;
   determining a data format of the transaction data as the first data format, and determining the transaction data in the first data format as the initial data; and
   invoking the first oracle contract and obtaining the initial data in the first data format from the first relay node.

3. The cross-blockchain mutual data storage method according to claim 1, wherein the verifying comprises:
   invoking a data verification function in the first oracle contract to verify an attribute of a data format of the initial data; and
   determining that the verification is successful in response to a determination that the attribute of the data format of the initial data conforms to an attribute of the first data format, which is used for data transaction in the first blockchain network.

4. The cross-blockchain mutual data storage method according to claim 1, wherein the converting the initial data from the first data format into the second data format and the determining the initial data in the second data format as the to-be-transferred data comprises:
   obtaining the second oracle contract deployed in the second node in response to a determination that the verification is successful; and
   determining a data format configured for cross-chain transaction specified in the first oracle contract and the second oracle contract as the second data format.

5. The cross-blockchain mutual data storage method according to claim 1, wherein the initial data is provided by the first relay node as a result of monitoring the target block in the first blockchain based on the first oracle contract.

6. The cross-blockchain mutual data storage method according to claim 1, further comprising receiving, in the first node, additional to-be-transferred data from the second blockchain network and based on the second oracle contract, such that the additional to-be-transferred data is stored in the first node.

7. The cross-blockchain mutual data storage method according to claim 1, wherein the verifying comprises:
   invoking a data verification function in the first oracle contract to verify an attribute of a data format of the initial data; and
   determining that the verification fails in response to a determination that the attribute of the data format of the initial data does not conform to the attribute of the first data format.

8. A cross-blockchain mutual data storage method, comprising:

receiving, by processing circuitry of a second node in a second blockchain network, based on a second cross-chain contract deployed in the second node, to-be-transferred data transmitted by a second relay node on the second blockchain network, the to-be-transferred data having been transmitted from a first relay node in a first blockchain network different from the second blockchain network to the second relay node, a first node in the first blockchain network deploying a first oracle contract and a first cross-chain contract, the second node deploying a second oracle contract, the to-be-transferred data being generated by the first node by converting initial data in a first data format into a second data format specified in the second oracle contract associated with the first oracle contract, the first node being configured to transmit the to-be-transferred data to the first relay node according to the first cross-chain contract, the first blockchain network corresponding to a first blockchain and the to-be-transferred data comprising transaction data in a first block in the first blockchain;

verifying the to-be-transferred data based on the second oracle contract;

converting the to-be-transferred data from the second data format to a third data format to obtain target data in response to a determination that the verification is successful;

writing the target data into a second blockchain corresponding to the second blockchain network; and establishing a mapping relationship between the target data and the transaction data based on a second block height of a second block to which the target data belongs in the second blockchain and a first block height of the first block to which the transaction data corresponding to the target data belongs in the first blockchain.

9. The cross-blockchain mutual data storage method according to claim 8, wherein the receiving comprises:

invoking a cross-chain data transfer function in the second cross-chain contract to receive signature information obtained in the second relay node by signing the to-be-transferred data based on a private key of the second relay node, the to-be-transferred data being obtained by the second relay node by decrypting encrypted data based on the private key of the second relay node, and the encrypted data being obtained by the first relay node in the first blockchain network by encrypting the to-be-transferred data based on a public key of the second relay node;

obtaining the public key of the second relay node in the second blockchain network;

performing signature verification on the signature information based on the public key to obtain a signature verification result; and obtaining the to-be-transferred data transmitted by the second relay node in response to a determination that the signature verification result indicates that the signature verification is successful.

10. The cross-blockchain mutual data storage method according to claim 8, wherein the verifying comprises:

obtaining a data format of the to-be-transferred data, and verifying a degree of matching between the data format of the to-be-transferred data and the second data format specified in the second oracle contract;

determining that the verification is successful in response to a determination that the degree of matching indicates that the data format of the to-be-transferred data is the second data format; and determining that the verification fails in response to a determination that the degree of matching indicates that the data format of the to-be-transferred data is not the second data format.

11. The cross-blockchain mutual data storage method according to claim 8, wherein the writing comprises:

generating, based on the target data, a to-be-verified block to be written into the second blockchain corresponding to the second blockchain network;

broadcasting the to-be-verified block to all blockchain nodes on the second blockchain; and writing the to-be-verified block into the second blockchain in response to a determination that all the blockchain nodes in the second blockchain reach a consensus.

12. The cross-blockchain mutual data storage method according to claim 8, further comprising:

determining a service category to which the target data belongs based on a second service contract deployed in the second node; and performing a service callback on the target data based in the service category.

13. The cross-blockchain mutual data storage method according to claim 8, wherein the verifying comprises:

invoking a data verification function in the second oracle contract to verify an attribute of a data format of the to-be-transferred data; and determine that the verification is successful in response to a determination that the attribute of the data format of the to-be-transferred data conforms to an attribute of the second data format.

14. A cross-blockchain mutual data storage apparatus, comprising:

processing circuitry of a first node in a first blockchain network, the processing circuitry being configured to:

obtain initial data in a first data format from a first relay node in the first blockchain network, the first blockchain network corresponding to a first blockchain, and the initial data including transaction data in a target block in the first blockchain;

verify the initial data according to a first oracle contract deployed in the first node;

in response to a determination that the verification was successful, convert, according to a second data format configured for cross-chain transaction and specified in a second oracle contract associated with the first oracle contract, the initial data from the first data format into the second data format, and determine the initial data in the second data format as to-be-transferred data, the second oracle contract being deployed on a second node in a second blockchain network; and transmit the to-be-transferred data to the first relay node by:

obtaining a first cross-chain contract deployed in the first node;

invoking a cross-chain data transfer function in the first cross-chain contract; and transmitting the to-be-transferred data to the first relay node, wherein the first relay node encrypts the to-be-transferred data based on a public key of a second relay node in the second blockchain network to obtain encrypted data and transmits the encrypted data to the second relay node, wherein the second relay node decrypts the encrypted data based on a private key of the second relay node to generate the to-be-transferred data and provides the to-be-transferred data to the second node, and wherein the second node stores the to-be-transferred data.

15. The cross-blockchain mutual data storage apparatus according to claim 14, wherein the processing circuitry is further configured to:

determine the first relay node that has a network connection relationship with the first node in the first blockchain network, and obtain the transaction data in the target block, the transaction data being determined according to a first service contract in the first node;

determine a data format of the transaction data as the first data format, and determine the transaction data in the first data format as the initial data; and invoke the first oracle contract and obtaining the initial data in the first data format from the first relay node.

16. The cross-blockchain mutual das age apparatus according to claim 14, wherein the circuitry is further configured to:

invoke a data verification function in the first oracle contract to verify an attribute of a data format of the initial data; and determine that the verification is successful in response to a determination that the attribute of the data format of the initial data conforms to an attribute of the first data format, which is used for data transaction in the first blockchain network.

17. The cross-blockchain mutual data storage apparatus according to claim 14, wherein the processing circuitry is further configured to:

obtain the second oracle contract deployed in the second node in response to a determination that the verification is successful; and determine a data format configured for cross-chain transaction specified in the first oracle contract and the second oracle contract as the second data format.

18. The cross-blockchain mutual data storage apparatus according to claim 14, wherein the initial data is provided by the first relay node as a result of monitoring the target block in the first blockchain based on the first oracle contract.

19. The cross-blockchain mutual data store apparatus according to claim 14, wherein the processing circuitry is further configured to receive, in the first node, additional to-be-transferred data from the second blockchain network based on a block generation status of a second blockchain in the second blockchain network and based on the second oracle contract, such that the additional to-be-transferred data is stored in the first node.

20. The cross-blockchain mutual data storage apparatus according to claim 14, wherein the verifying comprises:

invoking a data verification function in the first oracle contract to verify an attribute of a data format of the initial data; and determining that the verification fails in response to a determination that the attribute of the data format of the initial data does not conform to the attribute of the first data format.

* * * * *